US009331808B2

(12) United States Patent
Nakamoto

(10) Patent No.: US 9,331,808 B2
(45) Date of Patent: May 3, 2016

(54) OPTICAL TRANSMISSION APPARATUS AND OPTICAL TRANSMISSION METHOD

(71) Applicant: FUJITSU LIMITED, Kawasaki-shi, Kanagawa (JP)

(72) Inventor: Hiroshi Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/254,190

(22) Filed: Apr. 16, 2014

(65) Prior Publication Data
US 2014/0348506 A1 Nov. 27, 2014

(30) Foreign Application Priority Data

May 21, 2013 (JP) ................. 2013-107499

(51) Int. Cl.
H04B 10/00 (2013.01)
H04J 14/02 (2006.01)
H04J 14/06 (2006.01)
H04B 10/294 (2013.01)

(52) U.S. Cl.
CPC .......... H04J 14/0224 (2013.01); H04B 10/294 (2013.01); H04J 14/06 (2013.01)

(58) Field of Classification Search
CPC ........ H04J 14/0224; H04J 14/06; H04J 14/02
See application file for complete search history.

(56) References Cited

U.S. PATENT DOCUMENTS

| | | | | |
|---|---|---|---|---|
| 5,917,649 A * | 6/1999 | Mori | .................. | H04B 10/0731 356/73.1 |
| 6,038,357 A * | 3/2000 | Pan | ........................ | H04J 14/02 385/11 |
| 6,304,348 B1 * | 10/2001 | Watanabe | .......... | H04B 10/2531 398/9 |
| 6,320,694 B1 * | 11/2001 | Ohshima | ............. | H01S 3/06704 359/341.33 |
| 6,335,823 B2 * | 1/2002 | Ohshima | ...................... | 356/73.1 |
| 6,342,961 B1 | 1/2002 | Bergano et al. | | |
| 2006/0210211 A1 * | 9/2006 | Taylor | ..................... | H04J 14/02 385/1 |
| 2010/0322627 A1 * | 12/2010 | Desbruslais | ........... | G02B 6/274 398/65 |
| 2012/0051755 A1 * | 3/2012 | Arahira | .................. | H04L 9/0855 398/158 |
| 2012/0224866 A1 * | 9/2012 | Gaete | .................. | H04L 27/2096 398/186 |
| 2014/0286635 A1 * | 9/2014 | Kaneko | ............... | H04J 14/0221 398/34 |
| 2014/0348506 A1 * | 11/2014 | Nakamoto | .......... | H04J 14/0224 398/65 |

FOREIGN PATENT DOCUMENTS

| | | |
|---|---|---|
| JP | 2008-510388 | 4/2008 |
| JP | 2009-530943 | 8/2009 |
| WO | WO 2006/031340 A2 | 3/2006 |
| WO | WO 2007/107705 A1 | 9/2007 |

* cited by examiner

Primary Examiner — Danny Leung
(74) Attorney, Agent, or Firm — Staas & Halsey LLP

(57) ABSTRACT

An optical transmission apparatus includes: an optical amplifier configured to amplify a wavelength multiplexing light to be transmitted, the wavelength multiplexing light being input thereto; a combining unit configured to combine a plurality of non-signal lights in such a way that angles formed between polarization planes of the plurality of non-signal lights of a wavelength of wavelengths belonging to an amplification band of the optical amplifier become equal, the wavelength being different from a wavelength of a polarization multiplexing signal light; and a wavelength multiplexer configured to generate the wavelength multiplexing light to be input to the optical amplifier by multiplexing the plurality of non-signal lights combined by the combining unit and the polarization multiplexing signal light.

9 Claims, 14 Drawing Sheets

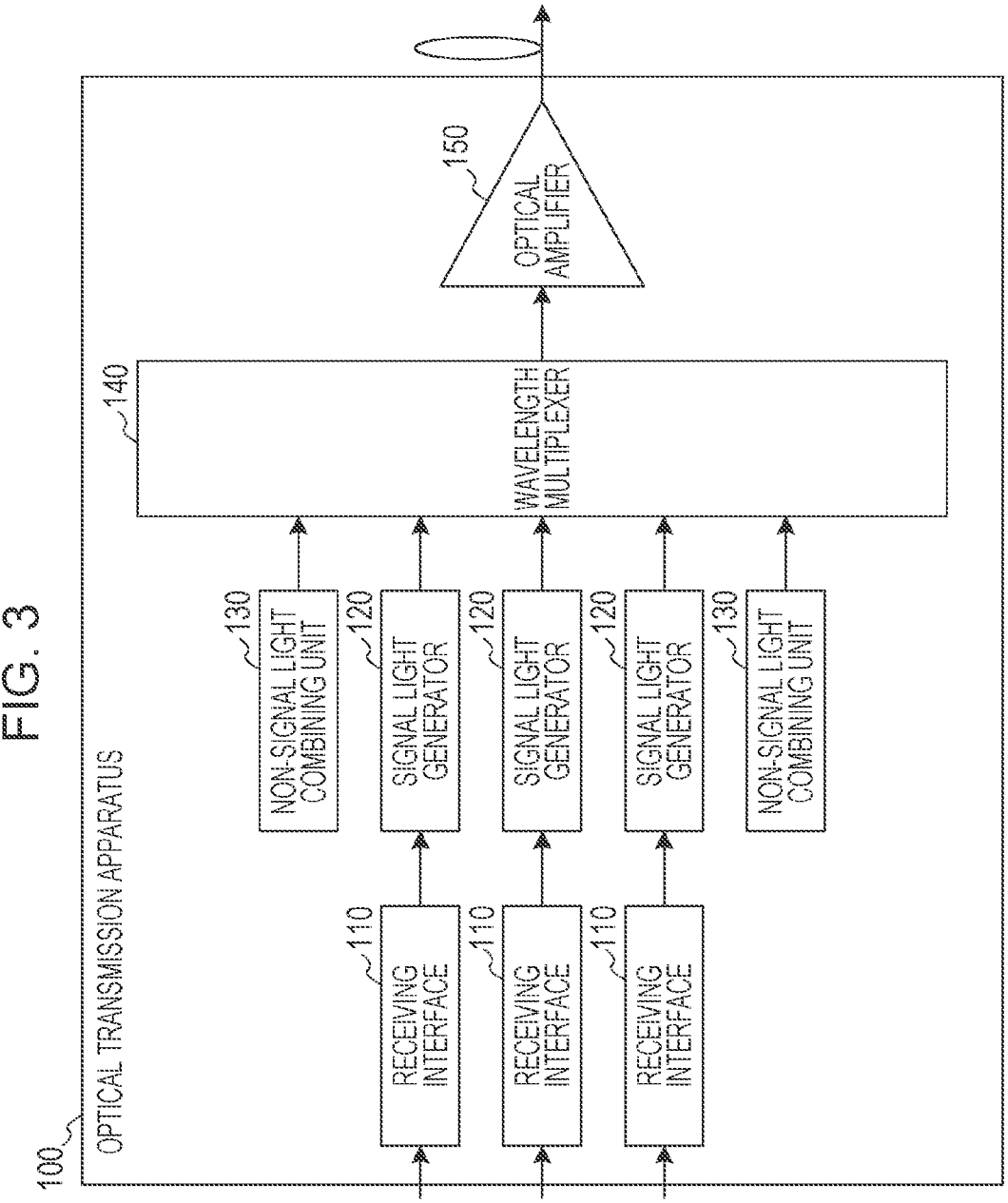

OPTICAL TRANSMISSION APPARATUS AND OPTICAL TRANSMISSION METHOD

CROSS-REFERENCE TO RELATED APPLICATION

This application is based upon and claims the benefit of priority of the prior Japanese Patent Application No. 2013-107499, filed on May 21, 2013, the entire contents of which are incorporated herein by reference.

FIELD

The embodiments discussed herein are related to optical transmission apparatuses and optical transmission methods.

BACKGROUND

In the past, in optical communications, a wavelength division multiplexing (WDM) that causes a wavelength multiplexing light obtained by multiplexing a plurality of signal lights of different wavelengths to pass through a transmission line such as an optical fiber and thereby transmits large volumes of information at one time has been known. In WDM, in general, by increasing the number of wavelengths or decreasing channel spacing, the capacity of information that is transmitted at one time is increased. As a transmission method for increasing the transmission capacity of information more efficiently, polarization multiplexing is known. Polarization multiplexing transmits two independent pieces of data information at one time by using a polarization multiplexing signal light obtained by combining two signal lights whose polarization planes are orthogonal to each other, and coherent reception is performed at a receiving end and polarization separation and waveform correction are performed by a digital signal processor (DSP).

In general, an optical transmission apparatus that adopts WDM and polarization multiplexing is provided with an optical amplifier that amplifies a wavelength multiplexing light to be transmitted. When a wavelength multiplexing light obtained as a result of polarization multiplexing signal lights having been multiplexed is input to the optical amplifier, the wavelength multiplexing light is amplified by using the optical amplifier, and the amplified wavelength multiplexing light is output to a transmission line such as an optical fiber.

Here, at the time of initial introduction of the optical transmission apparatus, sometimes only part of all the wavelengths belonging to the amplification band of the optical amplifier is used as a wavelength for amplifying the polarization multiplexing signal light in the wavelength multiplexing light and the other wavelengths are not used. In this case, the optical power per channel of the optical amplifier may be increased, and, due to the influence of the gain of the unused wavelength band, a phenomenon in which the gain wavelength characteristics of the optical amplifier are distorted may occur. An increase in the optical power per channel of the optical amplifier causes signal degradation by a deviation from the value of optimum optical power, and the phenomenon in which the gain wavelength characteristics of the optical amplifier are distorted is called a spectral hole burning phenomenon. The occurrence of the spectral hole burning phenomenon becomes a factor in deteriorating the transmission quality of a signal light that is output from the optical amplifier.

Thus, a technique of inputting a non-signal light to the unused wavelength band of the amplification band of the optical amplifier is being studied. In this technique, by multiplexing a non-signal light of a wavelength of the wavelengths belonging to the amplification band of the optical amplifier, the wavelength being different from the wavelength of a polarization multiplexing signal light, and the polarization multiplexing signal light, a wavelength multiplexing light is generated, and the wavelength multiplexing light thus generated is input to the optical amplifier. As the non-signal light, a continuous wave (CW) light having a single polarization plane is used. As described above, by inputting the non-signal light to the unused wavelength band of the amplification band of the optical amplifier, it is possible to suppress an increase in the optical power per channel of the optical amplifier and avoid the occurrence of the spectral hole burning phenomenon.

Japanese National Publication of International Patent Application No. 2008-510388 and Japanese National Publication of International Patent Application No. 2009-530943 are examples of related art.

SUMMARY

According to an aspect of the invention, an optical transmission apparatus includes: an optical amplifier configured to amplify a wavelength multiplexing light to be transmitted, the wavelength multiplexing light being input thereto; a combining unit configured to combine a plurality of non-signal lights in such a way that angles formed between polarization planes of the plurality of non-signal lights of a wavelength of wavelengths belonging to an amplification band of the optical amplifier become equal, the wavelength being different from a wavelength of a polarization multiplexing signal light; and a wavelength multiplexer configured to generate the wavelength multiplexing light to be input to the optical amplifier by multiplexing the plurality of non-signal lights combined by the combining unit and the polarization multiplexing signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram depicting the configuration of an optical transmission apparatus according to first embodiment;

DESCRIPTION OF EMBODIMENTS

Inputting a non-signal light to an unused wavelength band of the amplification band of an optical amplifier causes deterioration of the transmission quality of a polarization multiplexing signal light.

Figure 14:
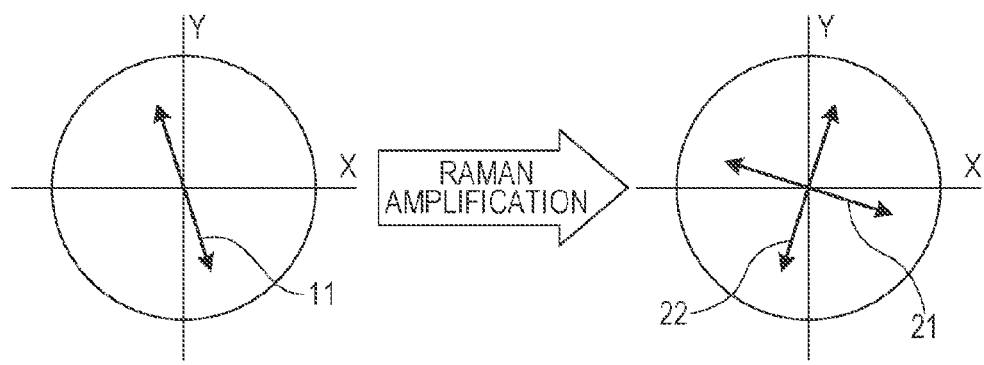
FIG. 14 is a diagram for explaining deterioration of the transmission quality of a polarization multiplexing signal light, the deterioration caused by the introduction of a non-signal light.

This problem will be explained by using FIG. 14. FIG. 14 is a diagram for explaining deterioration of the transmission quality of a polarization multiplexing signal light, the deterioration caused by the introduction of a non-signal light. A left part of FIG. 14 depicts the state of a polarization plane 11 of the non-signal light, and a right part of FIG. 14 depicts the state of polarization planes 21 and 22 of two signal lights in the polarization multiplexing signal light. The polarization planes 21 and 22 of the two signal lights in the polarization multiplexing signal light are assumed to be orthogonal to each other.

Since a CW light having a single polarization plane 11 is used as the non-signal light, after the non-signal light and the polarization multiplexing signal light are multiplexed, one signal light of the two signal lights in the polarization multiplexing signal light, the one signal light whose polarization plane is closer to the polarization plane 11 of the CW light, is more strongly subjected to Raman amplification by the CW light as compared to the other signal light. For example, as depicted in FIG. 14, of the polarization planes 21 and 22 of the two signal lights in the polarization multiplexing signal light, the polarization plane 22 is closer to the polarization plane 11 of the CW light as compared to the polarization plane 21. As a result, one signal light having the polarization plane 22 is more strongly subjected to Raman amplification by the CW light as compared to the other signal light having the polarization plane 21. Therefore, a power difference between the two signal lights in the polarization multiplexing signal light is caused. As a result, the transmission quality of the polarization multiplexing signal light, such as a signal-to-noise (SN) ratio and a Q-value, is deteriorated.

Moreover, when a transmission line such as an optical fiber is present in the sea, distortion occurs in the transmission line under the influence of the tidal current or the like, and, due to this distortion in the transmission line, the polarization plane of the CW light as the non-signal light may fluctuate with time. In this case, since the polarization planes of the two signal lights in the polarization multiplexing signal light follow the polarization plane of the CW light and fluctuate at higher speed than a polarization fluctuation speed that is processible by a DSP at a receiving end due to the occurrence of cross-phase modulation (XPM), the transmission quality of the polarization multiplexing signal light is deteriorated.

Hereinafter, embodiments of an optical transmission apparatus and an optical transmission method that are able to suppress deterioration of the transmission quality of a polarization multiplexing signal light, the deterioration caused by the introduction of a non-signal light, will be described in detail based on the drawings. Incidentally, these embodiments do not limit a technique that will be disclosed below.

First Embodiment

Figure 1A:
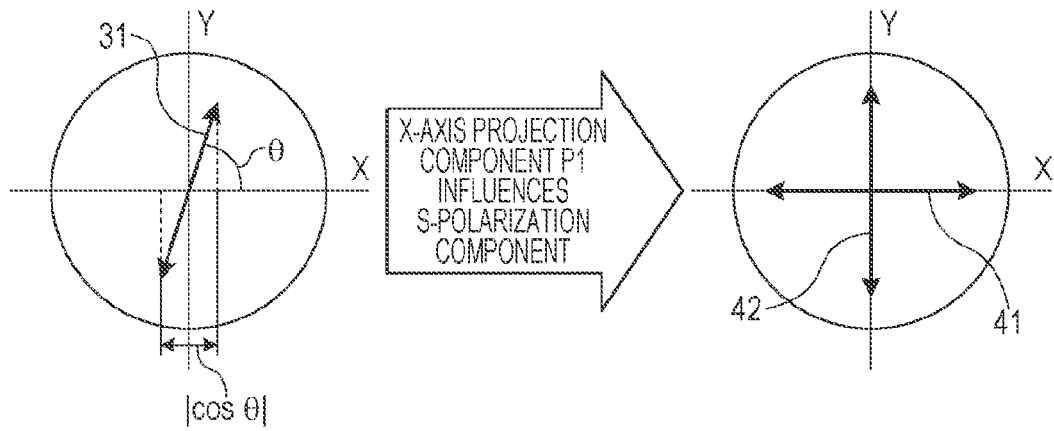
FIG. 1A is a diagram for explaining a technique of inputting a non-signal light to an unused wavelength band of the amplification band of an optical amplifier.

First, an example of an optical transmission method according to first embodiment will be described. Here, before an example of the optical transmission method according to first embodiment is described, as a technique on which the example of the optical transmission method according to first embodiment is predicated, a technique of inputting a non-signal light to an unused wavelength band of the amplification band of an optical amplifier will be described with reference to FIG. 1A. FIG. 1A is a diagram for explaining the technique of inputting a non-signal light to an unused wavelength band of the amplification band of an optical amplifier. A left part of FIG. 1A depicts the state of a polarization plane 31 of the non-signal light, and a right part of FIG. 1A depicts the state of polarization planes 41 and 42 of two signal lights in two signal lights in a polarization multiplexing signal light. The polarization planes 41 and 42 of the two signal lights in the polarization multiplexing signal light are assumed to be orthogonal to each other, and the polarization plane 41 is assumed to be parallel to the X-axis. In the following description, of the two signal lights in the polarization multiplexing signal light, a signal light having the polarization plane 41 is referred to as an "S-polarization component" and a signal light having the polarization plane 42 is referred to as a "P-polarization component".

In the technique on which the example of the optical transmission method according to first embodiment is predicated, the optical transmission apparatus generates a wavelength multiplexing light by multiplexing a non-signal light of a wavelength of the wavelengths belonging to the amplification band of the optical the amplifier, the wavelength being different from the wavelength of a polarization multiplexing signal light, and the polarization multiplexing signal light and inputs the generated wavelength multiplexing light to the optical amplifier. The non-signal light is a light that does not contain information such as communication data and is also called a dummy light. In this technique, as depicted in the left part of FIG. 1A, as the non-signal light, a CW light having a single polarization plane 31 is used. As a result, after the non-signal light and the polarization multiplexing signal light are multiplexed, one signal light of two signal lights in the polarization multiplexing signal light, the one signal light whose polarization plane is closer to the polarization plane 31 of the CW light, is more strongly subjected to Raman amplification by the non-signal light as compared to the other signal light. Assume that the angle formed by the polarization plane 31 of the non-signal light and the X-axis is θ and the amplitude of the non-signal light is 1. Then, the magnitude of a projection component P1 of the non-signal light with respect to the X-axis (hereinafter referred to as an "X-axis projection component") corresponds to the influence on the signal light having the polarization plane 41, that is, the S-polarization component. Here, the X-axis projection component P1 in the above technique is expressed by expression 1 below.

$$P1=|\cos\theta| \tag{1}$$

Figure 1B:
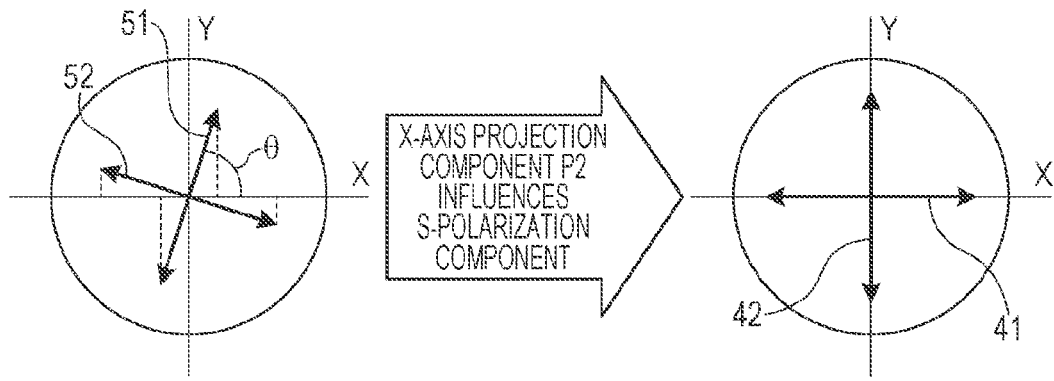
FIG. 1B is a diagram for explaining an optical transmission method according to first embodiment.
Figure 1C:
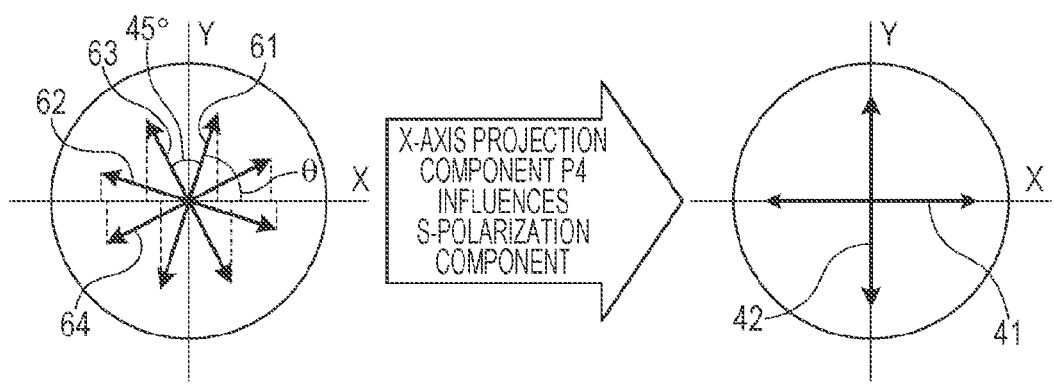
FIG. 1C is a diagram for explaining the optical transmission method according to first embodiment.

On the other hand, the optical transmission method (the non-signal light introduction method) according to first embodiment will be described with reference to FIGS. 1B and 1C. FIGS. 1B and 1C are diagrams for explaining the optical transmission method according to first embodiment. A left part of FIG. 1B depicts the state of polarization planes 51 and 52 of two non-signal lights, and a right part of FIG. 1B depicts the state of the polarization planes 41 and 42 of two signal lights in two signal lights in a polarization multiplexing signal light. A left part of FIG. 1C depicts the state of polarization planes 61, 62, 63, and 64 of four non-signal lights, and a right part of FIG. 1C depicts the state of polarization planes 41 and 42 of two signal lights in two signal lights in a polarization multiplexing signal light. The polarization planes 41 and 42 in the right part of FIG. 1B and the right part of FIG. 1C correspond to the polarization planes 41 and 42 depicted in the right part of FIG. 1A.

The optical transmission apparatus of first embodiment combines a plurality of non-signal lights in such way that the angles formed between the polarization planes of the plurality of non-signal lights of a wavelength become equal, the wavelength of the wavelengths belonging to the amplification band of the optical amplifier, the wavelength being different from the wavelength of a polarization multiplexing signal light. For example, as depicted in the left part of FIG. 1B, the optical transmission apparatus combines two non-signal lights in such a way that the angles formed between the polarization planes 51 and 52 of the two non-signal lights of a wavelength that is different from the wavelength of the polarization multiplexing signal light become 90 degrees. Moreover, for example, as depicted in the left part of FIG. 1C, the optical transmission method combines four non-signal lights in such a way that the angles formed between the polarization planes 61, 62, 63, and 64 of the four non-signal lights of a wavelength that is different from the wavelength of the polarization multiplexing signal light become 45 degrees.

Then, the optical transmission apparatus of first embodiment generates a wavelength multiplexing light to be input to the optical amplifier by multiplexing the plurality of non-signal lights combined and the polarization multiplexing signal light. For example, the optical transmission apparatus generates a wavelength multiplexing light to be input to the optical amplifier by multiplexing the two non-signal lights depicted in the left part of FIG. 1B and the polarization multiplexing signal light depicted in the right part of FIG. 1B. Moreover, for example, the optical transmission apparatus generates a wavelength multiplexing light to be input to the optical amplifier by multiplexing the four non-signal lights depicted in the left part of FIG. 1C and the polarization multiplexing signal light depicted in the right part of FIG. 1C. Here, assume that the angle formed by the polarization plane 51 of any one of the two non-signal lights depicted in the left part of FIG. 1B and the X-axis is θ. Then, an X-axis projection component P2 of the two non-signal lights combined is expressed by expression 2 below. Furthermore, assume that the angle formed by the polarization plane 61 of any one of the four non-signal lights depicted in the left part of FIG. 1C and the X-axis is θ. Then, an X-axis projection component P4 of the four non-signal lights combined is expressed by expression 3 below.

$$P2=0.5(|\cos\theta|+|\cos(\theta+90°)|) \tag{2}$$

$$P4=0.25(|\cos\theta|+|\cos(\theta+45°)|+|\cos(\theta+90°)|+|\cos(\theta+135°)|) \tag{3}$$

Figure 2:
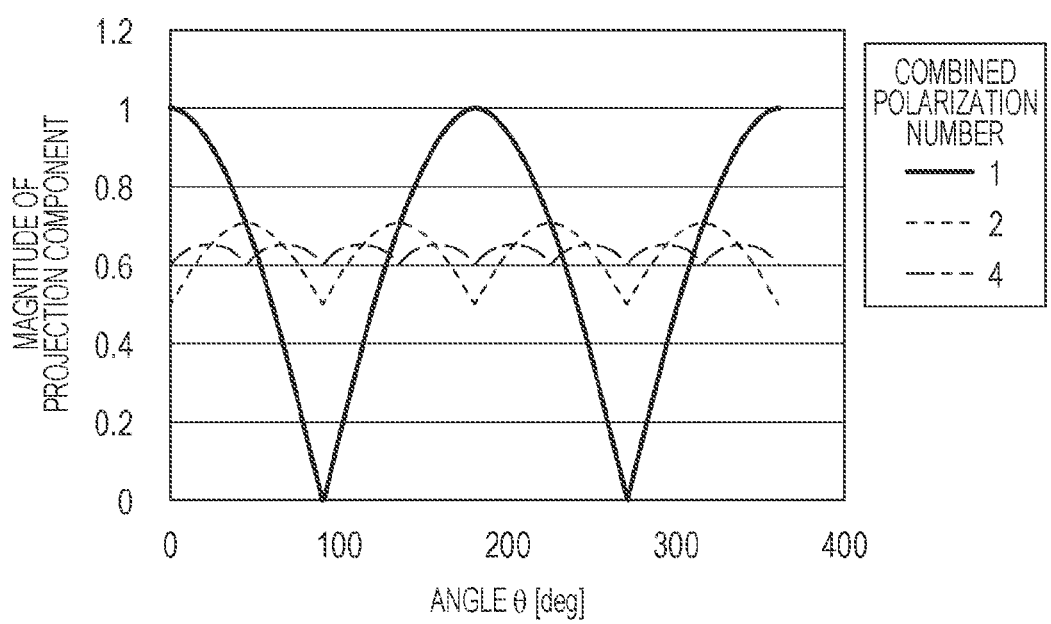
FIG. 2 is a diagram depicting the correlation between the angle formed by a polarization plane of a non-signal light and the X-axis and the magnitude of an X-axis projection component.

Here, a result obtained by a comparison between the technique on which the example of the optical transmission method according to first embodiment is predicated and first embodiment will be described with reference to FIG. 2. FIG. 2 is a diagram depicting the correlation between the angle formed by a polarization plane of a non-signal light and the X-axis and the magnitude of an X-axis projection component. In FIG. 2, the horizontal axis represents the angle θ [deg] and the vertical axis represents the magnitude of an X-axis projection component. Moreover, in FIG. 2, a combined polarization number indicates the number of non-signal lights combined by the optical transmission apparatus. That is, the combined polarization number="1" corresponds to the X-axis projection component P1 in the technique on which the example of the optical transmission method according to first embodiment is predicated, the combined polarization number="2" corresponds to the X-axis projection component P2 of the two non-signal lights combined, and the combined polarization number="4" corresponds to the X-axis projection component P4 of the four non-signal lights combined.

As depicted in FIG. 2, the amplitude of the X-axis projection component P2 of the two non-signal lights and the amplitude of the X-axis projection component P4 of the four non-signal lights are reduced as compared to the amplitude of the X-axis projection component P1 in the technique on which the example of the optical transmission method according to first embodiment is predicated. In other words, when the plurality of non-signal lights are combined in such a way that the angles formed between the polarization planes of the plurality of non-signal lights become equal, as compared to a case where the non-signal lights are not combined, the influence on the S-polarization component in the polarization multiplexing signal light is reduced.

Furthermore, as depicted in FIG. 2, the amplitude of the X-axis projection component P4 of the four non-signal lights is reduced as compared to the amplitude of the X-axis projection component P2 of the two non-signal lights. In other words, when the four non-signal lights are combined, as compared to a case where the two non-signal lights are combined, the influence on the S-polarization component in the polarization multiplexing signal light is reduced. Incidentally, in FIG. 2, an example in which, when a plurality of non-signal lights are combined, the influence on the S-polarization component in the polarization multiplexing signal light is reduced is depicted. Likewise, the influence on the signal light having the polarization plane 42 that is orthogonal to the polarization plane 41 of the S-polarization component, that is, the influence on the P-polarization component is also reduced.

The optical transmission apparatus of first embodiment combines a plurality of non-signal lights in such a way that the angles formed between the polarization planes of the plurality of non-signal lights become equal, the plurality of non-signal lights of a wavelength of the wavelengths belonging to the amplification band of the optical amplifier, the wavelength being different from the wavelength of a polarization multiplexing signal light, and multiplexes the plurality of non-signal lights combined and the polarization multiplexing signal light. Then, as a result of the plurality of non-signal lights combined and the polarization multiplexing signal light being multiplexed, a wavelength multiplexing light to be input to the optical amplifier is generated. Therefore, with the optical transmission apparatus of first embodiment, as compared to a case where the non-signal lights are not combined, it is possible to reduce the influence of the non-signal light on the S-polarization component and the P-polarization component in the polarization multiplexing signal light. As a result, with the optical transmission apparatus of first embodiment, it is possible to suppress deterioration of the transmission quality of the polarization multiplexing signal light, the deterioration caused by the introduction of the non-signal light.

Next, the configuration of an optical transmission apparatus 100 according to first embodiment will be described with reference to FIG. 3. FIG. 3 is a block diagram depicting the configuration of the optical transmission apparatus according to first embodiment. As depicted in FIG. 3, the optical transmission apparatus 100 includes receiving interfaces (IF) 110, signal light generators 120, non-signal light combining units 130, a wavelength multiplexer 140, and an optical amplifier 150.

The receiving interfaces 110 receive data output from an external terminal (not depicted) as an electrical signal and output the received electrical signals to the signal light generators 120.

The signal light generators 120 receive the electrical signals from the receiving interfaces 110. The signal light generators 120 convert the electrical signals into polarization multiplexing signal lights and output the polarization multiplexing signal lights obtained by conversion to the wavelength multiplexer 140. The polarization multiplexing signal light contains two signal lights of the same wavelength, the two signal lights whose polarization planes are orthogonal to each other. The polarization multiplexing signal light is obtained by modulating the electrical signal by using a modulation method such as dual polarization quadrature phase shift keying (DP-QPSK) or 16 quadrature amplitude modulation (DP-16QAM). In the following description, the polarization multiplexing signal light is written as a "DP signal light" as appropriate.

Each non-signal light combining unit 130 combines a plurality of non-signal lights in such a way that the angles formed between the polarization planes of the plurality of non-signal lights become equal, the plurality of non-signal lights of a wavelength of the wavelengths belonging to the amplification band of the optical amplifier 150, the wavelength being different from the wavelength of the DP signal light, and outputs, to the wavelength multiplexer 140, the plurality of non-signal lights combined.

For example, the non-signal light combining unit 130 combines two non-signal lights in such a way that the angles formed between the polarization planes of the two non-signal lights become 90 degrees, the two non-signal lights of a wavelength of the wavelengths belonging to the amplification band of the optical amplifier 150, the wavelength being different from the wavelength of the DP signal light. Moreover, for example, the non-signal light combining unit 130 combines four non-signal lights in such a way that the angles formed between the polarization planes of the four non-signal lights become 45 degrees, the four non-signal lights of a wavelength of the wavelengths belonging to the amplification band of the optical amplifier 150, the wavelength being different from the wavelength of the DP signal light.

Figure 4A:
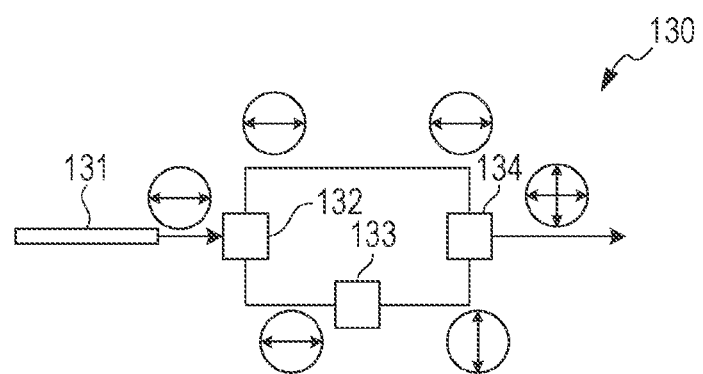
FIG. 4A is a diagram depicting a configuration example (I) of a non-signal light combining unit in first embodiment.

Here, a configuration example of the non-signal light combining unit 130 will be described with reference to FIGS. 4A and 4B. FIG. 4A is a diagram depicting a configuration example (I) of the non-signal light combining unit in first embodiment. The non-signal light combining unit 130 depicted in FIG. 4A includes a laser diode (LD) 131, a polarization maintaining coupler 132, a polarization 90-degree rotation element 133, and a polarization beam combiner 134. Incidentally, in FIG. 4A, the state of polarization of a light that is transmitted between the devices is also depicted.

The LD 131 is a light source and emits a CW light of a wavelength of the wavelengths belonging to the amplification band of the optical amplifier 150, the wavelength being different from the wavelength of the DP signal light. The polarization plane of the CW light emitted from the LD 131 is assumed to be in a horizontal state.

The polarization maintaining coupler 132 makes the CW light branch off while maintaining the polarization plane of the CW light emitted from the LD 131 in a horizontal state. The polarization maintaining coupler 132 outputs one non-signal light of the two lights obtained by branching (hereinafter referred to as "non-signal lights") to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132, and outputs the one non-signal light with the polarization plane rotated 90 degrees to the polarization beam combiner 134. That is, with respect to the polarization plane of the other non-signal light output from the polarization maintaining coupler 132, the polarization plane of the one non-signal light output from the polarization 90-degree rotation element 133 is inclined at an angle of 90 degrees and is in a vertical state.

The polarization beam combiner 134 combines the one non-signal light input from the polarization 90-degree rotation element 133 and the other non-signal light input from the polarization maintaining coupler 132 and outputs, to the wavelength multiplexer 140, the two non-signal lights combined. As a result, the two non-signal lights combined in such a way that the angles formed between the polarization planes of the two non-signal lights of a wavelength of the wavelengths belonging to the amplification band of the optical amplifier 150, the wavelength being different from the wavelength of the DP signal light, become 90 degrees are output to the wavelength multiplexer 140.

Figure 4B:
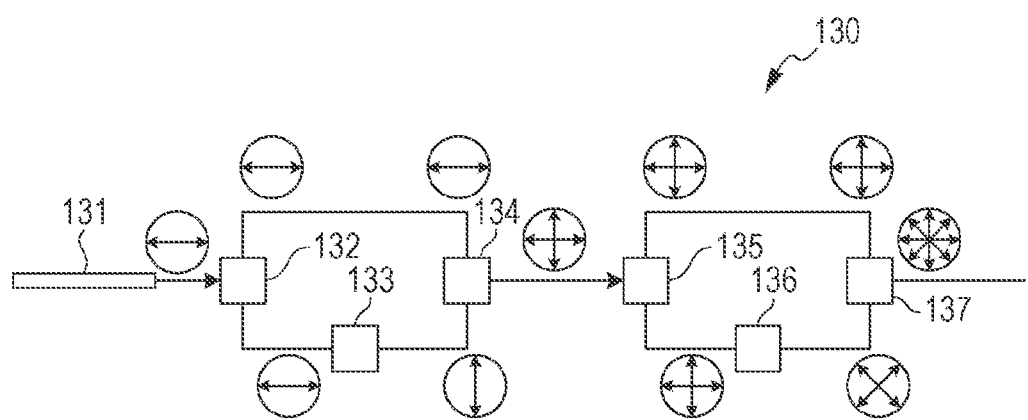
FIG. 4B is a diagram depicting a configuration example (II) of the non-signal light combining unit in first embodiment.

FIG. 4B is a diagram depicting a configuration example (II) of the non-signal light combining unit in first embodiment. The non-signal light combining unit 130 depicted in FIG. 4B includes an LD 131, a polarization maintaining coupler 132, a polarization 90-degree rotation element 133, a polarization beam combiner 134, a polarization maintaining coupler 135, a polarization 45-degree rotation element 136, and a polarization beam combiner 137. Of these component elements, the LD 131, the polarization maintaining coupler 132, the polarization 90-degree rotation element 133, and the polarization beam combiner 134 correspond to the LD 131, the polarization maintaining coupler 132, the polarization 90-degree rotation element 133, and the polarization beam combiner 134 depicted in FIG. 4A. However, the polarization beam combiner 134 combines one non-signal light input from the polarization 90-degree rotation element 133 and the other non-signal light input from the polarization maintaining coupler 132 and outputs, to the polarization maintaining coupler 135, the two non-signal lights combined.

The polarization maintaining coupler 135 makes the two non-signal lights combined, the two non-signal lights being input from the polarization beam combiner 134, branch off.

The polarization maintaining coupler 135 outputs one pair of two non-signal lights of the four non-signal lights obtained by branching to the polarization 45-degree rotation element 136 and outputs the other pair of two non-signal lights to the polarization beam combiner 137.

The polarization 45-degree rotation element 136 rotates the polarization planes of the one pair of two non-signal lights 45 degrees, the one pair of two non-signal lights being input from the polarization maintaining coupler 135, and outputs the one pair of two non-signal lights with the polarization planes rotated 45 degrees to the polarization beam combiner 137. That is, with respect to the polarization planes of the other pair of two non-signal lights output from the polarization maintaining coupler 135, the polarization planes of the one pair of two non-signal lights output from the polarization 45-degree rotation element 136 are inclined at an angle of 45 degrees.

The polarization beam combiner 137 combines the one pair of two non-signal lights input from the polarization 45-degree rotation element 136 and the other pair of two non-signal lights input from the polarization maintaining coupler 135 and outputs, to the wavelength multiplexer 140, the four non-signal lights combined. As a result, the four non-signal lights combined in such a way that the angles formed between the polarization planes of the four non-signal lights of a wavelength of the wavelengths belonging to the amplification band of the optical amplifier 150, the wavelength being different from the wavelength of the DP signal light, become 45 degrees are output to the wavelength multiplexer 140.

Back in FIG. 3, the wavelength multiplexer 140 receives, from each non-signal light combining unit 130, the plurality of non-signal lights combined. The wavelength multiplexer 140 receives a wavelength multiplexing signal light from each signal light generator 120. The wavelength multiplexer 140 generates a wavelength multiplexing light by multiplexing the plurality of non-signal lights combined and the DP signal light and outputs the generated wavelength multiplexing light to the optical amplifier 150. For example, the wavelength multiplexer 140 generates a wavelength multiplexing light by multiplexing the two non-signal lights combined, the two non-signal lights being input from the polarization beam combiner 134 of the non-signal light combining unit 130 depicted in FIG. 4A, and the DP signal light. Moreover, for example, the wavelength multiplexer 140 generates a wavelength multiplexing light by multiplexing the four non-signal lights combined, the four non-signal lights being input from the polarization beam combiner 137 of the non-signal light combining unit 130 depicted in FIG. 4B, and the DP signal light.

The optical amplifier 150 amplifies the wavelength multiplexing light input from the wavelength multiplexer 140 and outputs the amplified wavelength multiplexing light to a transmission line such as an optical fiber. The wavelength multiplexing light output to the transmission line propagates through the transmission line and is received by an apparatus at a receiving end. Since the wavelength multiplexing light contains the plurality of non-signal lights combined and the DP signal light, the influence of the non-signal light on the S-polarization component and the P-polarization component in the DP signal light is reduced. This makes it possible to suppress the occurrence of a power difference between the S-polarization component and the P-polarization component in the DP signal light. As a result, deterioration of the transmission quality of the DP signal light, such as an SN ratio and a Q-value, is suppressed. Moreover, even when the polarization plane of the non-signal light fluctuates with time, since XPM evenly takes place in both the S-polarization component and the P-polarization component in the DP signal light, temporal polarization fluctuations of the DP signal light are reduced, whereby deterioration of the transmission quality of a Q-value is suppressed.

Figure 5:
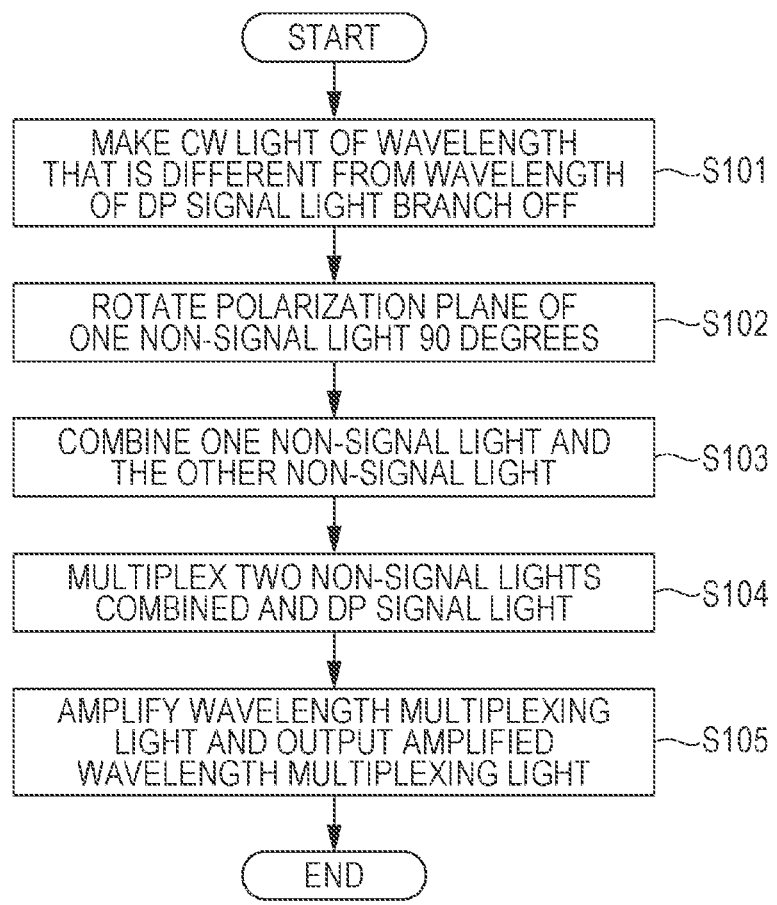
FIG. 5 is a flowchart (I) of a processing procedure performed by the optical transmission apparatus according to first embodiment.

Next, a processing procedure performed by the optical transmission apparatus 100 according to first embodiment will be described with reference to FIGS. 5 and 6. FIG. 5 is a flowchart (I) of the processing procedure performed by the optical transmission apparatus according to first embodiment. Incidentally, in FIG. 5, an example in which each non-signal light combining unit 130 of the optical transmission apparatus 100 has the configuration depicted in FIG. 4A and combines two non-signal lights will be described.

As depicted in FIG. 5, the polarization maintaining coupler 132 of the non-signal light combining unit 130 makes a CW light emitted from the LD 131, that is, the CW light of a wavelength of the wavelengths belonging to the amplification band of the optical amplifier 150, the wavelength being different from the wavelength of the DP signal light, branch off (operation S101). The polarization maintaining coupler 132 outputs one non-signal light of the two non-signal lights obtained by branching to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132 (operation S102). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S103). The polarization beam combiner 134 outputs, to the wavelength multiplexer 140, the two non-signal lights combined.

The wavelength multiplexer 140 generates a wavelength multiplexing light by multiplexing the two non-signal lights combined and the DP signal light (operation S104).

The optical amplifier 150 amplifies the wavelength multiplexing light input from the wavelength multiplexer 140 and outputs the amplified wavelength multiplexing light to a transmission line such as an optical fiber (operation S105).

Figure 6:
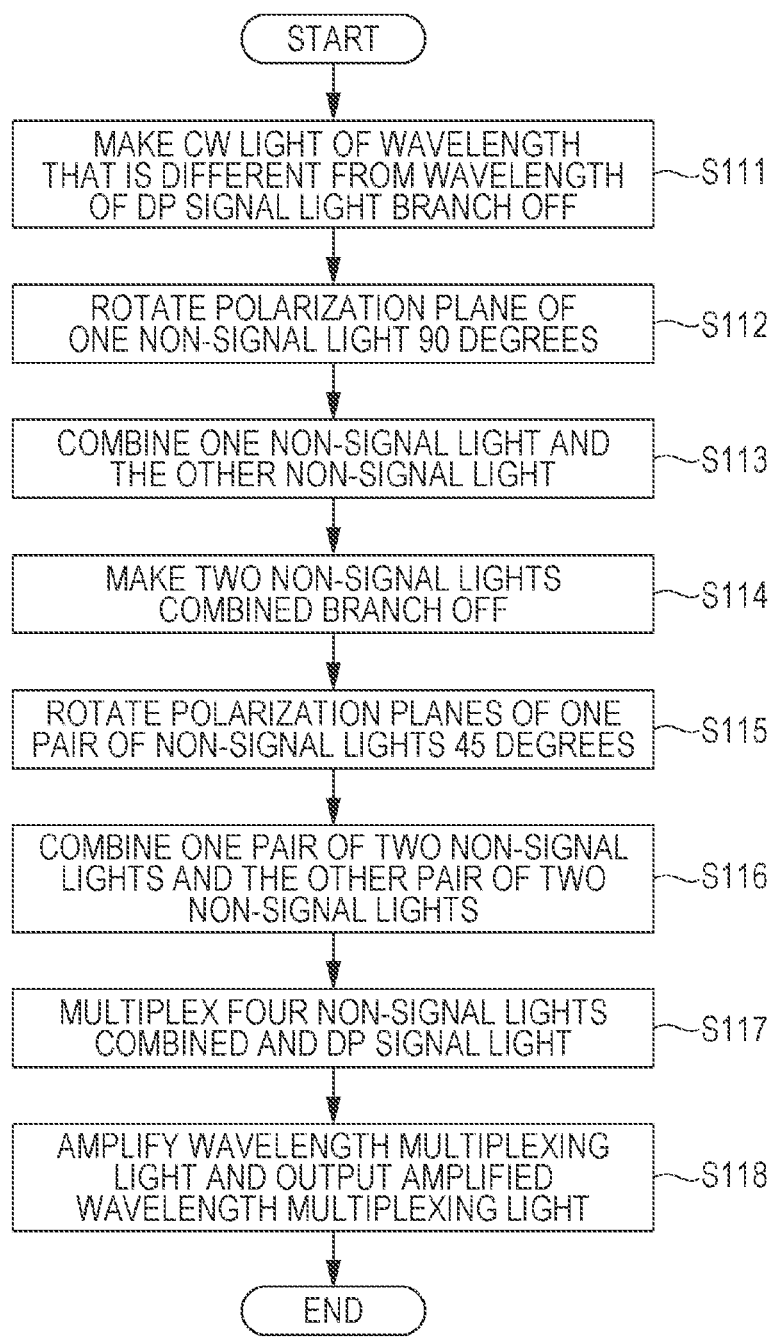
FIG. 6 is a flowchart (II) of a processing procedure performed by the optical transmission apparatus according to first embodiment.

FIG. 6 is a flowchart (II) of the processing procedure performed by the optical transmission apparatus according to first embodiment. Incidentally, in FIG. 6, an example in which each non-signal light combining unit 130 of the optical transmission apparatus 100 has the configuration depicted in FIG. 4B and combines four non-signal lights will be described. Since operations S111 to S113 depicted in FIG. 6 are the same as operations S101 to S103 depicted in FIG. 5, the descriptions thereof are omitted.

As depicted in FIG. 6, the polarization beam combiner 134 combines one non-signal light input from the polarization 90-degree rotation element 133 and the other non-signal light input from the polarization maintaining coupler 132 (operation S113) and outputs, to the polarization maintaining coupler 135, the two non-signal lights combined.

The polarization maintaining coupler 135 makes the two non-signal lights combined, the two non-signal lights being input from the polarization beam combiner 134, branch off (operation S114). The polarization maintaining coupler 135 outputs one pair of two non-signal lights of the four non-signal lights obtained by branching to the polarization 45-degree rotation element 136 and outputs the other pair of two non-signal lights to the polarization beam combiner 137.

The polarization 45-degree rotation element 136 rotates the polarization planes of the one pair of two non-signal lights 45 degrees, the one pair of two non-signal lights being input from the polarization maintaining coupler 135 (operation S115). The polarization 45-degree rotation element 136 outputs the one pair of two non-signal lights with the polarization planes rotated 45 degrees to the polarization beam combiner 137.

The polarization beam combiner 137 combines the one pair of two non-signal lights input from the polarization 45-degree rotation element 136 and the other pair of two non-signal lights input from the polarization maintaining coupler 135 (operation S116). The polarization beam combiner 137 outputs, to the wavelength multiplexer 140, the four non-signal lights combined.

The wavelength multiplexer 140 generates a wavelength multiplexing light by multiplexing the four non-signal lights combined and the DP signal light (operation S117).

The optical amplifier 150 amplifies the wavelength multiplexing light input from the wavelength multiplexer 140 and outputs the amplified wavelength multiplexing light to a transmission line such as an optical fiber (operation S118).

As described earlier, the optical transmission apparatus 100 of first embodiment combines a plurality of non-signal lights in such a way that the angles formed between the polarization planes of the plurality of non-signal lights become equal, the plurality of non-signal lights of a wavelength of the wavelengths belonging to the amplification band of the optical amplifier 150, the wavelength being different from the wavelength of the DP signal light. Then, the optical transmission apparatus 100 multiplexes the plurality of non-signal lights combined and the DP signal light. Then, as a result of the plurality of non-signal lights combined and the DP signal light being multiplexed, a wavelength multiplexing light to be input to the optical amplifier 150 is generated. Therefore, with the optical transmission apparatus 100 of first embodiment, as compared to a case where the non-signal lights are not combined, it is possible to reduce the influence of the non-signal light on the S-polarization component and the P-polarization component in the DP signal light. As a result, with the optical transmission apparatus 100 of first embodiment, it is possible to suppress deterioration of the transmission quality of the DP signal light, the deterioration caused by the introduction of the non-signal light.

Second Embodiment

In first embodiment, an example in which a plurality of non-signal lights of an arbitrary wavelength of the wavelengths belonging to the amplification band of the optical amplifier 150, the wavelength being different from the wavelength of the DP signal light, are combined has been described. However, a plurality of non-signal lights of a wavelength of the wavelengths belonging to the amplification band of the optical amplifier 150, the wavelength shorter that the shortest wavelength of the DP signal light, may be combined, and a plurality of non-signal lights of a wavelength longer than the longest wavelength of the DP signal light may be combined. Thus, in second embodiment, an example in which a plurality of non-signal lights of a wavelength of the wavelengths belonging to the amplification band of the optical amplifier 150, the wavelength shorter than the shortest wavelength of the DP signal light, are combined and a plurality of non-signal lights of a wavelength longer than the longest wavelength of the DP signal light are combined will be described.

Figure 7:
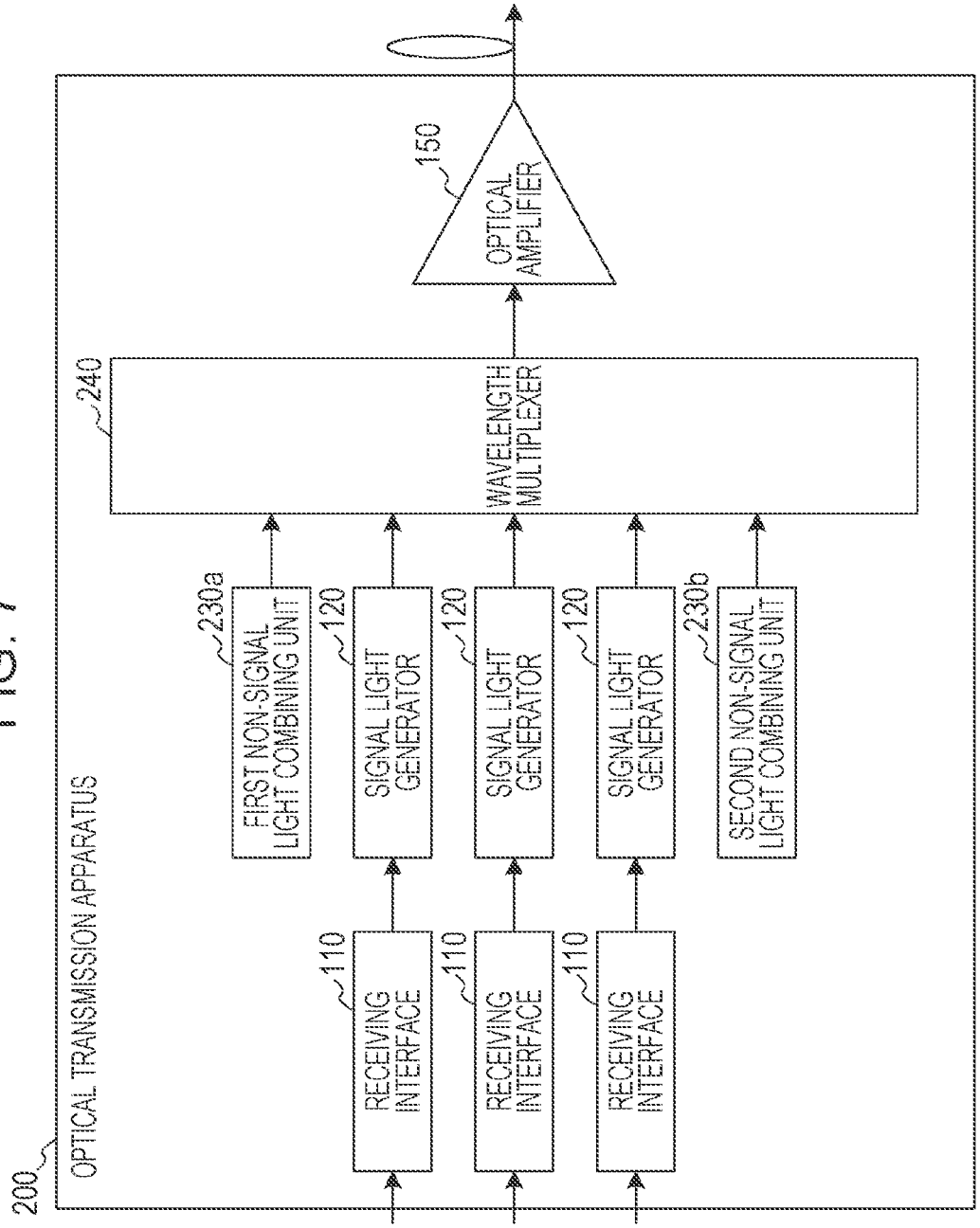
FIG. 7 is a block diagram depicting the configuration of an optical transmission apparatus according to second embodiment.

FIG. 7 is a block diagram depicting the configuration of an optical transmission apparatus according to second embodiment. In FIG. 7, such blocks as are found also in FIG. 3 are identified with the same characters and the descriptions thereof are omitted. An optical transmission apparatus 200 depicted in FIG. 7 includes, in place of the non-signal light combining units 130 and the wavelength multiplexer 140 depicted in FIG. 3, a first non-signal light combining unit 230a, a second non-signal light combining unit 230b, and a wavelength multiplexer 240.

The first non-signal light combining unit 230a combines a plurality of non-signal lights in such a way that the angles formed between the polarization planes of the plurality of non-signal lights of a wavelength of the wavelengths belonging to the amplification band of the optical amplifier 150, the wavelength shorter than the shortest wavelength of the DP signal light, become equal.

For example, assume that the wavelengths belonging to the amplification band of the optical amplifier 150 are a total of five wavelengths $\lambda 1$ to $\lambda 5$ ($\lambda 1 < \lambda 2 < \ldots < \lambda 5$) and, of these five wavelengths, three wavelengths $\lambda 2$ to $\lambda 4$ are used as the wavelength of the DP signal light. In this case, the first non-signal light combining unit 230a combines a plurality of non-signal lights in such a way that the angles formed between the polarization planes of the plurality of non-signal lights of the wavelength $\lambda 1$ that is shorter than the shortest wavelength $\lambda 2$ of the DP signal light become equal.

Incidentally, the detailed configuration of the first non-signal light combining unit 230a corresponds to the configuration of the non-signal light combining unit 130 depicted in FIG. 4A or the non-signal light combining unit 130 depicted in FIG. 4B. However, the first non-signal light combining unit 230a differs from the non-signal light combining unit 130 depicted in FIG. 4A or the non-signal light combining unit 130 depicted in FIG. 4B in that the LD 131 of the first non-signal light combining unit 230a emits a CW light of a wavelength of the wavelengths belonging to the amplification band of the optical amplifier 150, the wavelength shorter than the shortest wavelength of the DP signal light.

The second non-signal light combining unit 230b combines a plurality of non-signal lights in such a way that the angles formed between the polarization planes of the plurality of non-signal lights of a wavelength of the wavelengths belonging to the amplification band of the optical amplifier 150, the wavelength longer than the longest wavelength of the DP signal light, become equal.

For example, assume that the wavelengths belonging to the amplification band of the optical amplifier 150 are a total of five wavelengths $\lambda 1$ to $\lambda 5$ ($\lambda 1 < \lambda 2 < \ldots < \lambda 5$) and, of these five wavelengths, three wavelengths $\lambda 2$ to $\lambda 4$ are used as the wavelength of the DP signal light. In this case, the first non-signal light combining unit 230a combines a plurality of non-signal lights in such a way that the angles formed between the polarization planes of the plurality of non-signal lights of the wavelength $\lambda 5$ that is longer than the longest wavelength $\lambda 4$ of the DP signal light become equal.

Incidentally, the detailed configuration of the second non-signal light combining unit 230b corresponds to the configuration of the non-signal light combining unit 130 depicted in FIG. 4A or the non-signal light combining unit 130 depicted in FIG. 4B and therefore the descriptions thereof are omitted. However, the second non-signal light combining unit 230b differs from the non-signal light combining unit 130 depicted in FIG. 4A or the non-signal light combining unit 130 depicted in FIG. 4B in that the LD 131 of the second non-signal light combining unit 230b emits a CW light of a wavelength of the wavelengths belonging to the amplification band of the optical amplifier 150, the wavelength longer than the longest wavelength of the DP signal light.

The wavelength multiplexer 240 receives, from the first non-signal light combining unit 230a, the plurality of non-signal lights combined. The wavelength multiplexer 240 receives, from the second non-signal light combining unit 230b, the plurality of non-signal lights combined. The wavelength multiplexer 240 receives the DP signal light from the signal light generator 120. The wavelength multiplexer 240 generates a wavelength multiplexing light by multiplexing the plurality of non-signal lights combined by the first non-signal light combining unit 230a, the plurality of non-signal lights combined by the second non-signal light combining unit 230b, and the DP signal light. The wavelength multiplexer 240 outputs the generated wavelength multiplexing light to the optical amplifier 150.

Figure 8:
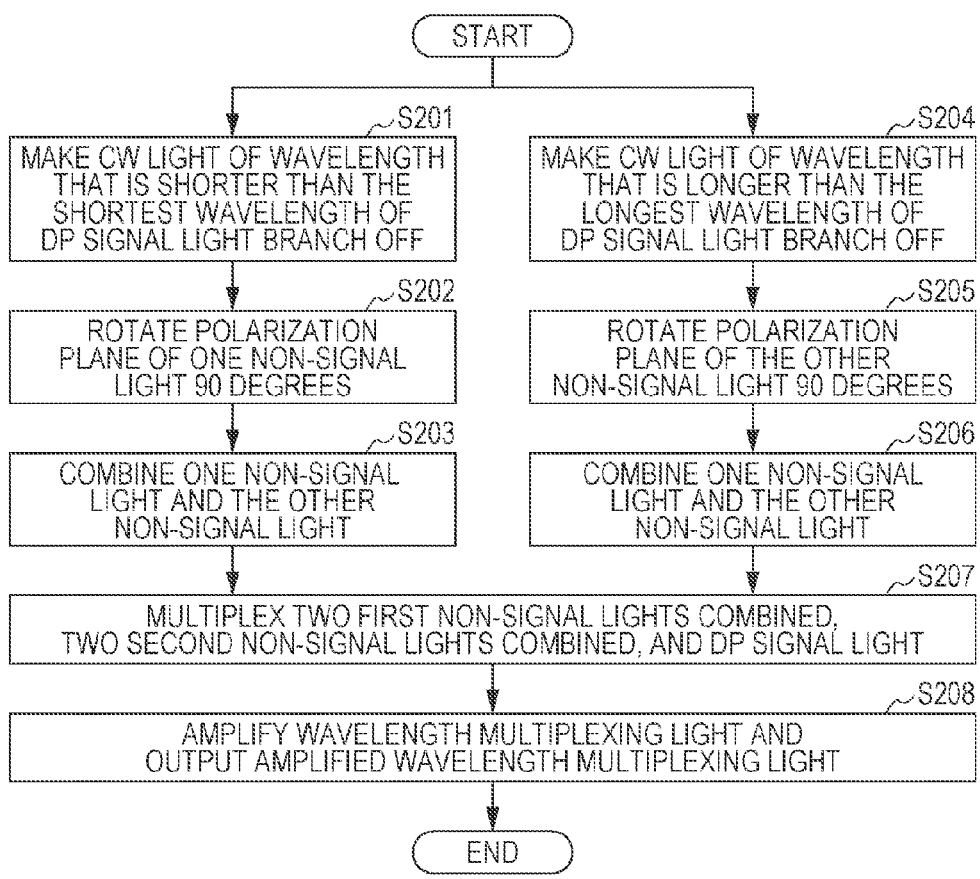
FIG. 8 is a flowchart of a processing procedure performed by the optical transmission apparatus according to second embodiment.

Next, a processing procedure performed by the optical transmission apparatus 200 according to second embodiment will be described with reference to FIG. 8. FIG. 8 is a flowchart of the processing procedure of the optical transmission apparatus according to second embodiment. Incidentally, in FIG. 8, an example in which the first non-signal light combining unit 230a and the second non-signal light combining unit 230b of the optical transmission apparatus 200 have the configuration depicted in FIG. 4A and combine two non-signal lights will be described.

As described in FIG. 8, the polarization maintaining coupler 132 of the first non-signal light combining unit 230a makes a CW light emitted from the LD 131, that is, the CW light of a wavelength of the wavelengths belonging to the amplification band of the optical amplifier 150, the wavelength being shorter than the shortest wavelength of the DP signal light, branch off (operation S201). The polarization maintaining coupler 132 outputs one non-signal light of the two non-signal lights obtained by branching to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132 (operation S202). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S203). In the following description, the one non-signal light and the other non-signal light combined by the polarization beam combiner 134 of the first non-signal light combining unit 230a are referred to as "two first non-signal lights". The polarization beam combiner 134 outputs, to the wavelength multiplexer 240, the two first non-signal lights combined.

Moreover, the polarization maintaining coupler 132 of the second non-signal light combining unit 230b makes a CW light emitted from the LD 131, that is, the CW light of a wavelength of the wavelengths belonging to the amplification band of the optical amplifier 150, the wavelength being longer than the longest wavelength of the DP signal light, branch off (operation S204). The polarization maintaining coupler 132 outputs one non-signal light of the two non-signal lights obtained by branching to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132 (operation S205). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S206). In the following description, the one non-signal light and the other non-signal light combined by the polarization beam combiner 134 of the second non-signal light combining unit 230b are referred to as "two second non-signal lights". The polarization beam combiner 134 outputs, to the wavelength multiplexer 240, the two second non-signal lights combined.

The wavelength multiplexer 240 generates a wavelength multiplexing light by multiplexing the two first non-signal lights combined, the two second non-signal lights combined, and the DP signal light (operation S207).

The optical amplifier 150 amplifies the wavelength multiplexing light input from the wavelength multiplexer 240 and outputs the amplified wavelength multiplexing light to a transmission line such as an optical fiber (operation S208).

As described earlier, the optical transmission apparatus 200 of second embodiment combines a plurality of non-signal lights of a wavelength of the wavelengths belonging to the amplification band of the optical amplifier 150, the wavelength being shorter than the shortest wavelength of the DP signal light, and combines a plurality of non-signal lights of a wavelength that is longer than the longest wavelength of the DP signal light. Since the gains at both ends of the amplification band of the optical amplifier 150 become smaller than the gain in a central part thereof, the power near the shortest wavelength of the DP signal light and the power near the longest wavelength of the DP signal light may be reduced as compared to the power of the non-signal light. For this reason, the optical transmission apparatus 200 of second embodiment multiplexes a plurality of non-signal lights of a wavelength that is shorter than the shortest wavelength of the DP signal light, a plurality of non-signal lights of a wavelength that is longer than the longest wavelength of the DP signal light, and the DP signal light. Therefore, with the optical transmission apparatus 200 of second embodiment, it is possible to reduce the influence of the non-signal light on the shortest wavelength component and the longest wavelength component of the DP signal light whose powers are more likely to be reduced. As a result, with the optical transmission apparatus 200 of second embodiment, it is possible to suppress deterioration of the transmission quality of the shortest wavelength component and the longest wavelength component of the DP signal light, the deterioration caused by the introduction of the non-signal light.

Third Embodiment

In first embodiment, an example in which the four non-signal lights combined in such a way that the angles formed between the polarization planes of the four non-signal lights of a wavelength of the wavelengths belonging to the amplification band of the optical amplifier 150, the wavelength being different from the wavelength of the DP signal light, become 45 degrees are output to the wavelength multiplexer 140 has been described. However, two non-signal lights of a first wavelength that is different from the wavelength of the DP signal light may be combined, two non-signal lights of a second wavelength adjacent to the first wavelength may be combined, and a total of four non-signal lights may be output to the wavelength multiplexer 140 in such a way that the angles formed between the polarization planes become 45 degrees. In third embodiment, an example in which two non-signal lights of a first wavelength that is different from the wavelength of the DP signal light are combined, two non-signal lights of a second wavelength adjacent to the first wavelength are combined, and a total of four non-signal lights are output to the wavelength multiplexer in such a way that the angles formed between the polarization planes become 45 degrees will be described.

Figure 9:
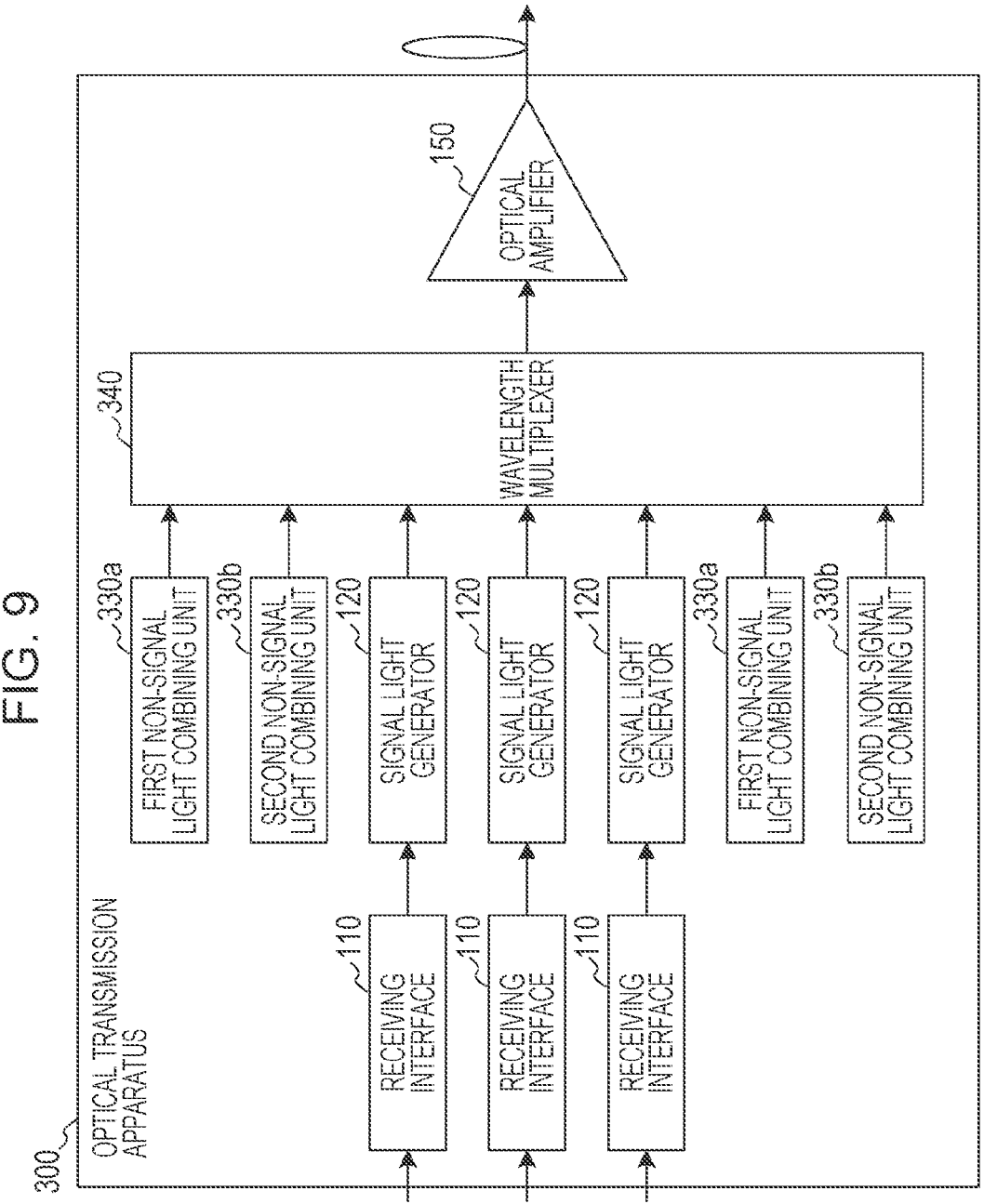
FIG. 9 is a block diagram depicting the configuration of an optical transmission apparatus according to third embodiment.

FIG. 9 is a block diagram depicting the configuration of an optical transmission apparatus according to third embodiment. In FIG. 9, such blocks as are found also in FIG. 3 are identified with the same characters and the descriptions thereof are omitted. An optical transmission apparatus 300 depicted in FIG. 9 includes, in place of the non-signal light combining units 130 and the wavelength multiplexer 140 depicted in FIG. 3, first non-signal light combining units 330a, second non-signal light combining units 330b, and a wavelength multiplexer 340.

Each first non-signal light combining unit 330a combines two non-signal lights of a wavelength λa in such a way that the angles formed between the polarization planes of the two non-signal lights of the wavelength λa of the wavelengths belonging to the amplification band of the optical amplifier 150, the wavelength λa that is different from the wavelength of the DP signal light, become 90 degrees. In the following description, the two non-signal lights combined by the first non-signal light combining unit 330a are referred to as "two first non-signal lights". The first non-signal light combining unit 330a outputs the two first non-signal lights to the wavelength multiplexer 340.

Incidentally, the detailed configuration of the first non-signal light combining unit 330a corresponds to the configuration of the non-signal light combining unit 130 depicted in FIG. 4A. However, the first non-signal light combining unit 330a differs from the non-signal light combining unit 130 depicted in FIG. 4A in that the LD 131 of the first non-signal light combining unit 330a emits a CW light of a wavelength λa of the wavelengths belonging to the amplification band of the optical amplifier 150, the wavelength λa that is different from the wavelength of the DP signal light.

Each second non-signal light combining unit 330b combines two non-signal lights of a wavelength λb in such a way that the angles formed between the polarization planes of the two non-signal lights of the wavelength λb within a predetermined range from the wavelength λa become 90 degrees. The predetermined range is preferably a range of 0.8 nm or less and, more preferably, a range of 0.4 nm or less. In the following description, the two non-signal lights combined by the second non-signal light combining unit 330b are referred to as "two second non-signal lights". The second non-signal light combining unit 330b outputs the two second non-signal lights to the wavelength multiplexer 340.

Incidentally, the detailed configuration of the second non-signal light combining unit 330b corresponds to the configuration of the non-signal light combining unit 130 depicted in FIG. 4A. However, the second non-signal light combining unit 330b differs from the non-signal light combining unit 130 depicted in FIG. 4A in that the LD 131 of the second non-signal light combining unit 330b emits a CW light of a wavelength λb within a predetermined range from the wavelength λa.

The wavelength multiplexer 340 receives the two first non-signal lights from each first non-signal light combining unit 330a. The wavelength multiplexer 340 receives, from each second non-signal light combining unit 330b, the two non-signal lights obtained by rotating the polarization planes of the two second non-signal lights 45 degrees with respect to the polarization planes of the two first non-signal lights. For example, when the two second non-signal lights propagate through an optical path that is twisted 45 degrees with respect to the optical path connecting the wavelength multiplexer 340 and the first non-signal light combining unit 330a and reach the wavelength multiplexer 340, the polarization planes of the two second non-signal lights are rotated 45 degrees with respect to the polarization planes of the two first non-signal lights. The wavelength multiplexer 340 receives the DP signal light from the signal light generator 120. The wavelength multiplexer 340 generates a wavelength multiplexing light by multiplexing the two first non-signal lights, two non-signal lights obtained by rotating the polarization planes of the two second non-signal lights 45 degrees with respect to the polarization planes of the two first non-signal lights, and the DP signal light. The wavelength multiplexer 340 outputs the generated wavelength multiplexing light to the optical amplifier 150.

Figure 10:
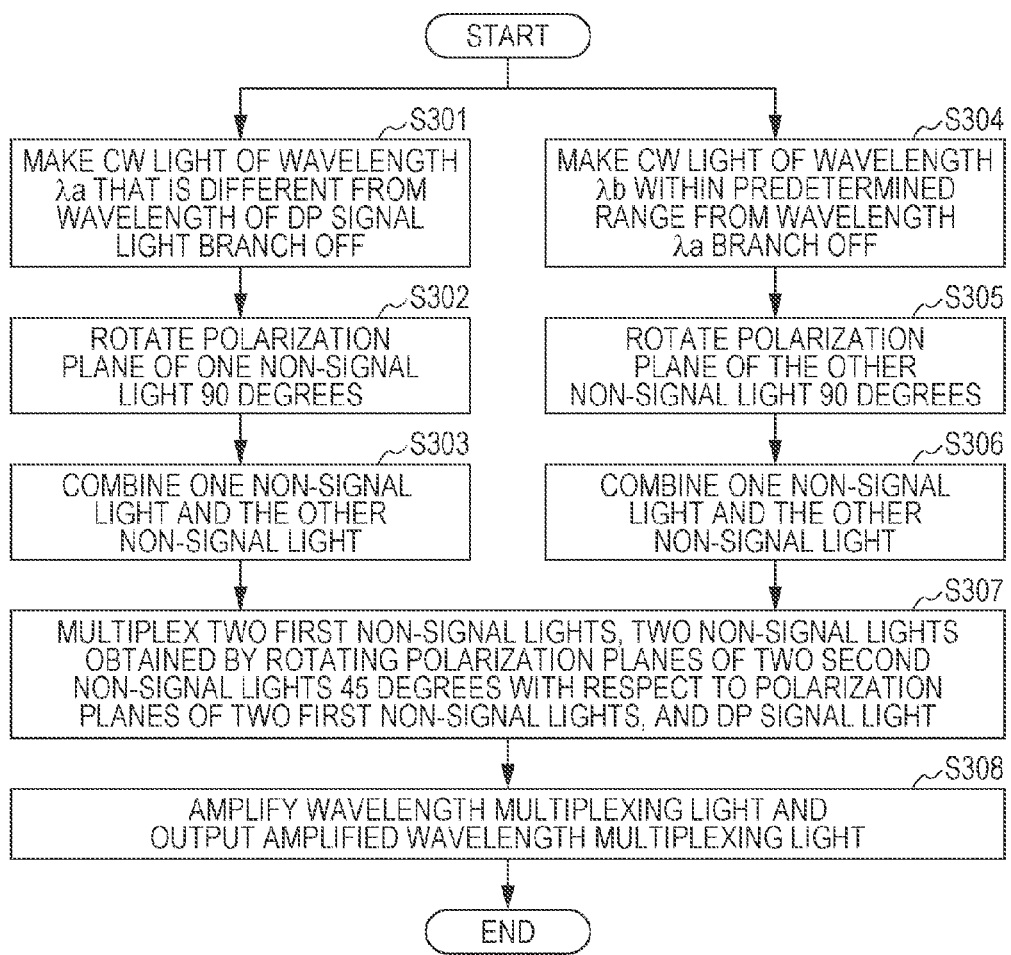
FIG. 10 is a flowchart of a processing procedure performed by the optical transmission apparatus according to third embodiment.

Next, a processing procedure performed by the optical transmission apparatus 300 according to third embodiment will be described with respect to FIG. 10. FIG. 10 is a flowchart of the processing procedure of the optical transmission apparatus according to third embodiment. Incidentally, in FIG. 10, an example in which the first non-signal light combining units 330a and the second non-signal light combining units 330b of the optical transmission apparatus 300 have the configuration depicted in FIG. 4A and combine two non-signal lights will be described.

As depicted in FIG. 10, the polarization maintaining coupler 132 of each first non-signal light combining unit 330a makes a CW light emitted from the LD 131, that is, the CW light of a wavelength λa of the wavelengths belonging to the amplification band of the optical amplifier 150, the wavelength λa that is different from the wavelength of the DP signal light, branch off (operation S301). The polarization maintaining coupler 132 outputs one non-signal light of the two non-signal lights obtained by branching to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132 (operation S302). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S303). As a result, two first non-signal lights are obtained. The polarization beam combiner 134 outputs the two first non-signal lights to the wavelength multiplexer 340.

Moreover, the polarization maintaining coupler 132 of each second non-signal light combining unit 330b makes a CW light emitted from the LD 131, that is, the CW light of a wavelength λb within a predetermined range from the wavelength λa, branch off (operation S304). The polarization maintaining coupler 132 outputs one non-signal light of the two non-signal lights obtained by branching to the polarization 90-degree rotation element 133 and outputs the other non-signal light to the polarization beam combiner 134.

The polarization 90-degree rotation element 133 rotates the polarization plane of the one non-signal light 90 degrees, the one non-signal light input from the polarization maintaining coupler 132 (operation S305). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S306). As a result, two second non-signal lights are obtained. The polarization beam combiner 134 outputs the two second non-signal lights to the wavelength multiplexer 340.

The wavelength multiplexer 340 generates a wavelength multiplexing light by multiplexing the two first non-signal lights, two non-signal lights obtained by rotating the polarization planes of the two second non-signal lights 45 degrees with respect to the polarization planes of the two first non-signal lights, and the DP signal light (operation S307).

The optical amplifier 150 amplifies the wavelength multiplexing light input from the wavelength multiplexer 340 and outputs the amplified wavelength multiplexing light to a transmission line such as an optical fiber (operation S308).

As described earlier, the optical transmission apparatus 300 of third embodiment combines two non-signal lights in such a way that the angles formed between the polarization planes of the two non-signal lights of a wavelength λa that is different from the wavelength of the DP signal light become 90 degrees. Then, the optical transmission apparatus 300 combines two non-signal lights in such a way that the angles formed between the polarization planes of the two non-signal lights of a wavelength λb adjacent to the wavelength λa become 90 degrees. In addition, the optical transmission apparatus 300 generates a wavelength multiplexing light by multiplexing the two non-signal lights of the wavelength λa, two non-signal lights obtained by rotating the polarization planes of the two non-signal lights of the wavelength λb 45 degrees, the wavelength λb adjacent to the wavelength λa, and the DP signal light. As a result, with the optical transmission apparatus 300 of third embodiment, it is possible to suppress deterioration of the transmission quality of the DP signal light, the deterioration caused by the introduction of the non-signal light, without combining four non-signal lights of a wavelength that is different from the wavelength of the DP signal light.

Fourth Embodiment

In first embodiment, an example in which a wavelength multiplexing light is generated by multiplexing a plurality of non-signal lights combined and a DP signal light has been described. However, a wavelength multiplexing light may be generated by multiplexing a plurality of non-signal lights combined, a wavelength component contained in an amplified spontaneous emission (ASE) light, and a DP signal light. Therefore, in fourth embodiment, an example in which a wavelength multiplexing light is generated by multiplexing a plurality of non-signal lights combined, a wavelength component contained in an ASE light, and a DP signal light will be described.

Figure 11:
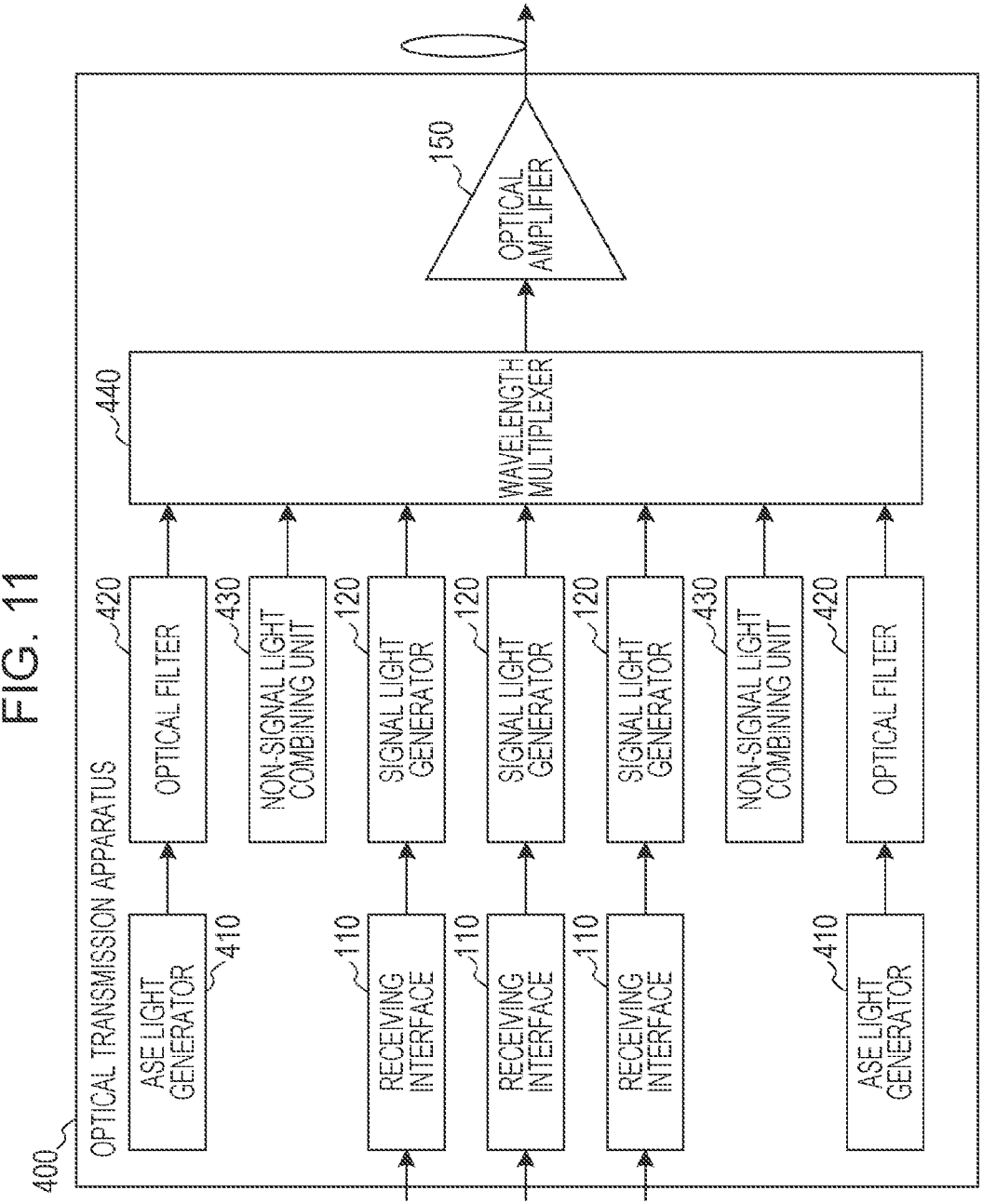
FIG. 11 is a block diagram depicting the configuration of an optical transmission apparatus according to fourth embodiment.

FIG. 11 is a block diagram depicting the configuration of an optical transmission apparatus according to fourth embodiment. In FIG. 11, such blocks as are found also in FIG. 3 are identified with the same characters and the descriptions thereof are omitted. An optical transmission apparatus 400 depicted in FIG. 11 includes ASE light generators 410 and optical filters 420 as additional component elements and includes, in place of the non-signal light combining units 130 and the wavelength multiplexer 140 depicted in FIG. 3, non-signal light combining units 430 and a wavelength multiplexer 440.

Each ASE light generator 410 generates an ASE light containing a plurality of wavelength components. For example, the ASE light generator 410 generates an ASE light by using an optical fiber to which erbium is added.

Each optical filter 420 is a filter with a transmission band that allows, of the plurality of wavelength components contained in the ASE light, a wavelength component of a wavelength that is different from the wavelength of a DP signal light, to pass therethrough. The wavelength component passing through the optical filter 420 is input to the wavelength multiplexer 440.

Each non-signal light combining unit 430 combines a plurality of non-signal lights in such a way that the angles formed between the polarization planes of the plurality of non-signal lights of a wavelength that is different from the wavelength of the DP signal light and the wavelength of the wavelength component that has passed through the optical filter 420 become equal.

For example, assume that the wavelengths belonging to the amplification band of the optical amplifier 150 are a total of nine wavelengths λ1 to λ9 and, of these nine wavelengths, three wavelengths λ4 to λ6 are used as the wavelength of the DP signal light and the transmission band of the optical filter 420 is the wavelengths λ1, λ2, λ8, and λ9. In this case, the non-signal light combining unit 430 combines a plurality of non-signal lights in such a way that the angles formed between the polarization planes of the plurality of non-signal lights of a wavelength λ3 become equal, the wavelength λ3 that is different from the wavelength of the DP signal light and the wavelength of the wavelength component that has passed through the optical filter 420. Furthermore, the non-signal light combining unit 430 combines a plurality of non-signal lights in such a way that the angles formed between the polarization planes of the plurality of non-signal lights of a wavelength λ7 become equal, the wavelength λ7 that is different from the wavelength of the DP signal light and the wavelength of the wavelength component that has passed through the optical filter 420.

Incidentally, the detailed configuration of the non-signal light combining unit 430 corresponds to the configuration of the non-signal light combining unit 130 depicted in FIG. 4A or the non-signal light combining unit 130 depicted in FIG. 4B. However, the non-signal light combining unit 430 differs from the non-signal light combining unit 130 depicted in FIG. 4A or the non-signal light combining unit 130 depicted in FIG. 4B in that the LD 131 of the non-signal light combining unit 430 emits a CW light of a wavelength that is different from the wavelength of the DP signal light and the wavelength of the wavelength component that has passed through the optical filter 420.

The wavelength multiplexer 440 receives, from each non-signal light combining unit 430, a plurality of non-signal lights combined. The wavelength multiplexer 440 receives, from each optical filter 420, the wavelength component that has passed through the optical filter 420. The wavelength multiplexer 440 receives a DP signal light from each signal light generator 120. The wavelength multiplexer 440 generates a wavelength multiplexing light to be input to the optical amplifier 150 by multiplexing the plurality of non-signal lights combined, the wavelength component that has passed through the optical filter 420, and the DP signal light. The wavelength multiplexer 440 outputs the generated wavelength multiplexing light to the optical amplifier 150.

Figure 12:
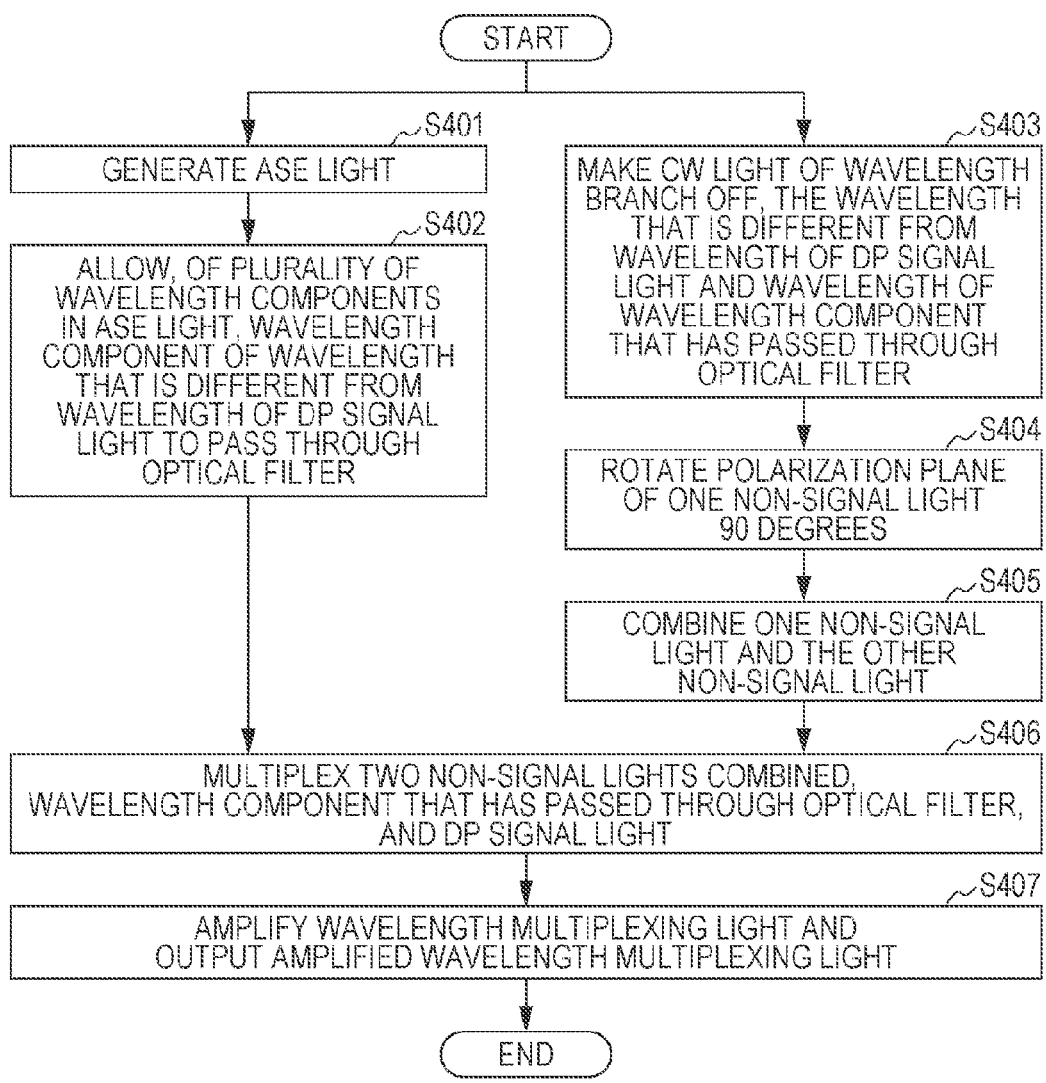
FIG. 12 is a flowchart of a processing procedure performed by the optical transmission apparatus according to fourth embodiment.

Next, a processing procedure performed by the optical transmission apparatus 400 according to fourth embodiment will be described with reference to FIG. 12. FIG. 12 is a flowchart depicting the processing procedure of the optical transmission apparatus according to fourth embodiment. Incidentally, in FIG. 12, an example in which each non-signal light combining unit 430 of the optical transmission apparatus 400 has the configuration depicted in FIG. 4A and combines two non-signal lights will be described.

As depicted in FIG. 12, each ASE light generator 410 generates an ASE light containing a plurality of wavelength components (operation S401). Each optical filter 420 allows, of the plurality of wavelength components contained in the ASE light, a wavelength component of a wavelength that is different from the wavelength of the DP signal light to pass therethrough (operation S402).

Moreover, the polarization maintaining coupler 132 of the non-signal light combining unit 430 makes a CW light emitted from the LD 131, that is, the CW light of a wavelength that is different from the wavelength of the DP signal light and the wavelength of the wavelength component that has passed through the optical filter 420, branch off (operation S403).

The polarization 90-degree rotation element 133 rotates the polarization plane of one non-signal light 90 degrees, the one non-signal light input from the polarization maintaining coupler 132 (operation S404). The polarization 90-degree rotation element 133 outputs the one non-signal light with the polarization plane rotated 90 degrees to the polarization beam combiner 134.

The polarization beam combiner 134 combines the one non-signal light input from the polarization 90-degree rotation element 133 and the other non-signal light input from the polarization maintaining coupler 132 (operation S405).

The wavelength multiplexer 440 generates a wavelength multiplexing light to be input to the optical amplifier 150 by multiplexing the two non-signal lights combined, the wavelength component that has passed through the optical filter 420, and the DP signal light (operation S406).

The optical amplifier 150 amplifies the wavelength multiplexing light input from the wavelength multiplexer 440 and outputs the amplified wavelength multiplexing light to a transmission line such as an optical fiber (operation S407).

As described earlier, the optical transmission apparatus 400 of fourth embodiment generates a wavelength multiplexing light to be input to the optical amplifier 150 by multiplexing the plurality of non-signal lights combined, the wavelength component contained in the ASE light, and the DP signal light. Therefore, with the optical transmission apparatus 400 of fourth embodiment, it is possible to supply a non-signal light for a wavelength band that is not accommodated by the wavelength component contained in the ASE light, the wavelength band of the amplification band of the optical amplifier 150. As a result, it is possible to suppress deterioration of the transmission quality of the DP signal light, the deterioration caused by the introduction of the non-signal light, while suppressing the occurrence of a spectral hole burning phenomenon by the wavelength component contained in the ASE light and the non-signal light.

Modified Example

Incidentally, in third embodiment described above, an example in which a wavelength multiplexing light is generated by multiplexing two non-signal lights of a wavelength λa, two non-signal lights obtained by rotating the polarization planes of two non-signal lights of a wavelength λb adjacent to the wavelength λa 45 degrees, and a DP signal light has been described. However, a wavelength multiplexing light may be generated by multiplexing four non-signal lights of different wavelengths and a DP signal light. Therefore, in a modified example of third embodiment, an example in which a wavelength multiplexing light is generated by multiplexing four non-signal lights of different wavelengths and a DP signal light will be described.

Figure 13:
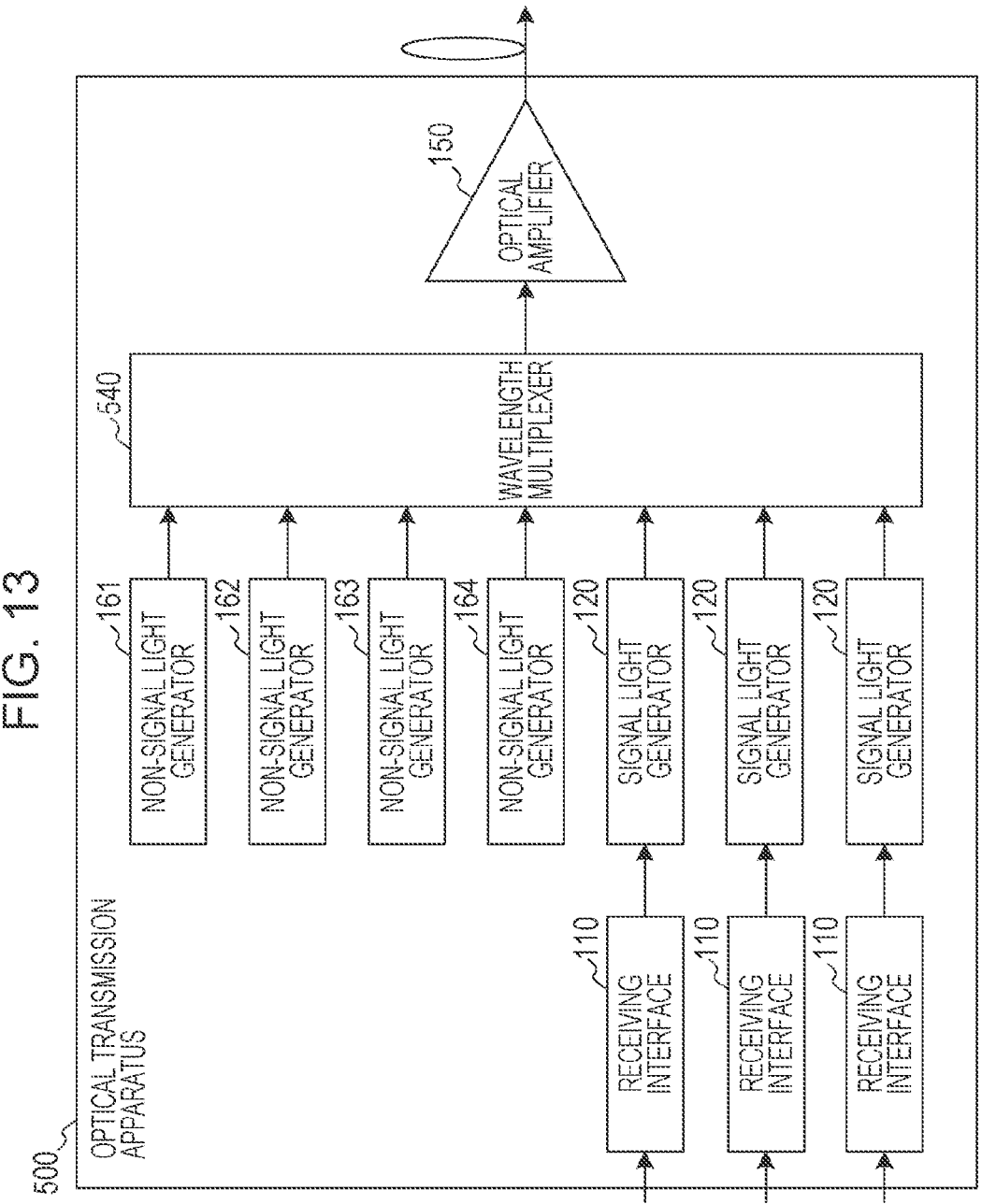
FIG. 13 is a block diagram depicting the configuration of an optical transmission apparatus according to a modified example of third embodiment.

FIG. 13 is a block diagram depicting the configuration of an optical transmission apparatus according to a modified example of third embodiment. In FIG. 13, such blocks as are found also in FIG. 9 are identified with the same characters and the descriptions thereof are omitted. An optical transmission apparatus 500 depicted in FIG. 13 includes, in place of the first non-signal light combining units 330a, the second non-signal light combining units 330b, and the wavelength multiplexer 340 depicted in FIG. 9, non-signal light generators 161 to 164 and a wavelength multiplexer 540.

The non-signal light generator 161 generates a non-signal light (hereinafter referred to as a "reference non-signal light") of a wavelength λa of the wavelengths belonging to the amplification band of the optical amplifier 150, the wavelength λa that is different from the wavelength of the DP signal light. For example, the non-signal light generator 161 includes an LD that emits a CW light of the wavelength λa of the wavelengths belonging to the amplification band of the optical amplifier 150, the wavelength λa that is different from the wavelength of the DP signal light, and generates the CW light emitted from the LD as the reference non-signal light.

The non-signal light generator 162 generates a non-signal light (hereinafter a "45-degree non-signal light") of a wavelength λb within a predetermined range from the wavelength λa, the non-signal light with a polarization plane that is inclined at only 45 degrees with respect to the polarization plane of the non-signal light of the wavelength λa. The predetermined range is preferably a range of 0.8 nm or less and, more preferably, a range of 0.4 nm or less. For example, the non-signal light generator 162 includes an LD that emits a CW light of the wavelength λb within the predetermined range from the wavelength λa and a polarization 45-degree rotation element and generates the 45-degree non-signal light by allowing the CW light emitted from the LD to pass through the polarization 45-degree rotation element.

The non-signal light generator 163 generates a non-signal light (hereinafter a "90-degree non-signal light") of a wavelength λc within a predetermined range from the wavelength λb, the non-signal light with a polarization plane that is inclined at only 45 degrees with respect to the polarization plane of the non-signal light of the wavelength λb. The predetermined range is preferably a range of 0.8 nm or less and, more preferably, a range of 0.4 nm or less. For example, the non-signal light generator 163 includes an LD that emits a CW light of the wavelength λc within the predetermined range from the wavelength λb and a polarization 45-degree rotation element and generates the 90-degree non-signal light by allowing the CW light emitted from the LD to pass through the polarization 45-degree rotation element.

The non-signal light generator 164 generates a non-signal light (hereinafter a "135-degree non-signal light") of a wavelength λd within a predetermined range from the wavelength λc, the non-signal light with a polarization plane that is inclined at only 45 degrees with respect to the polarization plane of the non-signal light of the wavelength λc. The predetermined range is preferably a range of 0.8 nm or less and, more preferably, a range of 0.4 nm or less. For example, the non-signal light generator 164 includes an LD that emits a CW light of the wavelength λd within the predetermined range from the wavelength λc and a polarization 45-degree rotation element and generates the 135-degree non-signal light by allowing the CW light emitted from the LD to pass through the polarization 45-degree rotation element.

The wavelength multiplexer 540 generates a wavelength multiplexing light to be input to the optical amplifier 150 by multiplexing the reference non-signal light, the 45-degree non-signal light, the 90-degree non-signal light, the 135-degree non-signal light, and the DP signal light.

According to the modified example of third embodiment, as is the case with third embodiment, it is possible to suppress deterioration of the transmission quality of the DP signal light, the deterioration caused by the introduction of the non-signal light, without combining four non-signal lights of a wavelength that is different from the wavelength of the DP signal light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    an optical amplifier configured to amplify a wavelength multiplexing light to be transmitted, the wavelength multiplexing light being input thereto;
    a combining unit configured to
        generate a plurality of non-signal lights having a wavelength among a plurality of wavelengths belonging to an amplification band of the optical amplifier, the wavelength being different from a wavelength of a polarization multiplexing signal light,
        rotate a polarization plane of a non-signal light among the plurality of non-signal lights, and
        combine the rotated polarization plane of the non-signal light among the plurality of non-signal lights and polarization planes of the plurality of non-signal lights in such a way that angles formed between the polarization planes of the plurality of non-signal lights become equal; and
    a wavelength multiplexer configured to generate the wavelength multiplexing light to be input to the optical amplifier by multiplexing the plurality of non-signal lights combined by the combining unit and the polarization multiplexing signal light.

2. The optical transmission apparatus according to claim 1, wherein
    the combining unit combines polarization planes of two non-signal lights among the plurality of non-signal lights in such a way that angles formed between the polarization planes of the two non-signal lights become 90 degrees.

3. The optical transmission apparatus according to claim 1, wherein
    the combining unit combines polarization planes of four non-signal lights among the plurality of non-signal lights in such a way that angles formed between the polarization planes of the four non-signal lights become 45 degrees.

4. The optical transmission apparatus according to claim 1, wherein
    the combining unit includes:
        a first combining unit configured to combine polarization planes of a plurality of non-signal lights having a wavelength among the plurality of wavelengths belonging to the amplification band of the optical amplifier, the wavelength being shorter than a shortest wavelength of the polarization multiplexing signal light, in such a way that angles formed between the polarization planes of the plurality of non-signal lights become equal; and
        a second combining unit configured to combine polarization planes of a plurality of non-signal lights having a wavelength among the plurality of wavelengths belonging to the amplification band of the optical amplifier, the wavelength being longer than a longest wavelength of the polarization multiplexing signal light, in such a way that angles formed between the polarization planes of the plurality of non-signal lights become equal, and
    the wavelength multiplexer generates the wavelength multiplexing light to be input to the optical amplifier by multiplexing the plurality of non-signal lights combined by the first combining unit, the plurality of non-signal lights combined by the second combining unit, and the polarization multiplexing signal light.

5. The optical transmission apparatus according to claim 2, wherein
    the combining unit includes:
        a first combining unit configured to combine polarization planes of a plurality of non-signal lights having a wavelength among the plurality of wavelengths belonging to the amplification band of the optical amplifier, the wavelength being shorter than a shortest wavelength of the polarization multiplexing signal light, in such a way that angles formed between the polarization planes of the plurality of non-signal lights become equal; and
        a second combining unit configured to combine polarization planes of a plurality of non-signal lights having a wavelength among the plurality of wavelengths belonging to the amplification band of the optical amplifier, the wavelength being longer than a longest wavelength of the polarization multiplexing signal light, in such a way that angles formed between the polarization planes of the plurality of non-signal lights become equal, and
    the wavelength multiplexer generates the wavelength multiplexing light to be input to the optical amplifier by multiplexing the plurality of non-signal lights combined by the first combining unit, the plurality of non-signal lights combined by the second combining unit, and the polarization multiplexing signal light.

6. The optical transmission apparatus according to claim 3, wherein
    the combining unit includes:
        a first combining unit configured to combine polarization planes of a plurality of non-signal lights having a wavelength among the plurality of wavelengths belonging to the amplification band of the optical amplifier, the wavelength being shorter than a shortest wavelength of the polarization multiplexing signal light, in such a way that angles formed between the polarization planes of the plurality of non-signal lights become equal; and a second combining unit configured to combine polarization planes of a plurality of non-signal lights having a wavelength among the plurality of wavelengths belonging to the amplification band of the optical amplifier, the wavelength being longer than a longest wavelength of the polarization multiplexing signal light, in such a way that angles formed between the polarization planes of the plurality of non-signal lights become equal, and the wavelength multiplexer generates the wavelength multiplexing light to be input to the optical amplifier by multiplexing the plurality of non-signal lights combined by the first combining unit, the plurality of non-signal lights combined by the second combining unit, and the polarization multiplexing signal light.

7. The optical transmission apparatus according to claim 1, wherein the combining unit includes:
a first combining unit configured to combine polarization planes of two non-signal lights among the plurality of non-signal lights and of a first wavelength among the plurality of wavelengths belonging to the amplification band of the optical amplifier, the first wavelength being different from the wavelength of the polarization multiplexing signal light, in such a way that angles formed between the polarization planes of the two non-signal lights of the first wavelength become 90 degrees; and a second combining unit configured to combine polarization planes of two non-signal lights among the plurality of non-signal lights and of a second wavelength among the plurality of wavelengths belonging to the amplification band of the optical amplifier, the second wavelength being different from the wavelength of the polarization multiplexing signal light, in such a way that angles formed between the polarization planes of the two non-signal lights of the second wavelength within a predetermined range from the first wavelength become 90 degrees, and the wavelength multiplexer generates the wavelength multiplexing light to be input to the optical amplifier by multiplexing the two non-signal lights combined by the first combining unit, two non-signal lights obtained by rotating polarization planes of the two non-signal lights combined by the second combining unit 45 degrees with respect to polarization planes of the two non-signal lights, and the polarization multiplexing signal light.

8. The optical transmission apparatus according to claim 1, further comprising:

an amplified spontaneous emission light generator configured to generate an amplified spontaneous emission light containing a plurality of wavelengths; and an optical filter configured to have a transmission band that allows a wavelength among the plurality of wavelengths contained in the amplified spontaneous emission light to pass therethrough, the wavelength being different from the wavelength of the polarization multiplexing signal light, wherein the combining unit combines polarization planes of a plurality of non-signal lights of a wavelength that is different from the wavelength of the polarization multiplexing signal light and the wavelength that has passed through the optical filter, in such a way that angles formed between the polarization planes of the plurality of non-signal lights become equal, and wherein the wavelength multiplexer generates the wavelength multiplexing light to be input to the optical amplifier by multiplexing the plurality of non-signal lights combined by the combining unit, light of the wavelength passed through the optical filter, and the polarization multiplexing signal light.

9. An optical transmission method, comprising:

generating a plurality of non-signal lights having a wavelength among a plurality of wavelengths belonging to an amplification band of an optical amplifier, the wavelength being different from a wavelength of a polarization multiplexing signal light, rotating a polarization plane of a non-signal light among the plurality of non-signal lights, combining the rotated polarization plane of the non-signal light among the plurality of non-signal lights and polarization planes of the plurality of non-signal lights in such a way that angles formed between the polarization planes of the plurality of non-signal lights become equal, and generating a wavelength multiplexing light to be input to the optical amplifier that amplifies the wavelength multiplexing light to be transmitted, by multiplexing the plurality of non-signal lights combined by the combining and the polarization multiplexing signal light.

* * * * *